(12) United States Patent
Lahnala et al.

(10) Patent No.: US 11,013,069 B2
(45) Date of Patent: May 18, 2021

(54) SLIDING WINDOW ASSEMBLY

(71) Applicants: AGC AUTOMOTIVE AMERICAS R&D, INC., Ypsilanti, MI (US); AGC FLAT GLASS NORTH AMERICA, INC., Alpharetta, GA (US); GRAND RAPIDS CONTROLS COMPANY, LLC, Rockford, MI (US)

(72) Inventors: David W. Lahnala, Adrian, MI (US); Daniel Bennett, Tecumseh, MI (US); James W. Bach, Grand Rapids, MI (US)

(73) Assignees: AGC FLAT GLASS NORTH AMERICA, INC., Alpharetta, GA (US); GRAND RAPIDS CONTROLS COMPANY, LLC, Rockford, MI (US); AGC AUTOMOTIVE AMERICAS CO., Alpharetta, GA (US)

(*) Notice: Subject to any disclaimer, the term of this patent is extended or adjusted under 35 U.S.C. 154(b) by 860 days.

(21) Appl. No.: 15/515,060

(22) PCT Filed: Sep. 29, 2015

(86) PCT No.: PCT/US2015/052923
§ 371 (c)(1),
(2) Date: Mar. 28, 2017

(87) PCT Pub. No.: WO2016/054027
PCT Pub. Date: Apr. 7, 2016

(65) Prior Publication Data
US 2017/0238371 A1 Aug. 17, 2017

Related U.S. Application Data

(60) Provisional application No. 62/056,923, filed on Sep. 29, 2014.

(51) Int. Cl.
*H05B 3/84* (2006.01)
*B60J 1/18* (2006.01)
(Continued)

(52) U.S. Cl.
CPC .............. *H05B 3/84* (2013.01); *B60J 1/1853* (2013.01); *B60S 1/026* (2013.01); *E05D 15/06* (2013.01);
(Continued)

(58) Field of Classification Search
CPC ................ H05B 3/84; H05B 2203/014; H05B 2203/016; E05F 15/60
(Continued)

(56) References Cited

U.S. PATENT DOCUMENTS 3,544,737 A    12/1970   Nowak
4,388,522 A     6/1983   Boaz
(Continued)

FOREIGN PATENT DOCUMENTS

DE    199 30 541 A1    1/2001
FR      2932736 A1    12/2009
WO     03024156 A2     3/2003

OTHER PUBLICATIONS

International Search Report for Application No. PCT/US2011/060455 dated Feb. 10, 2012, 4 pages.
(Continued)

*Primary Examiner* — Thien S Tran
(74) *Attorney, Agent, or Firm* — Howard & Howard Attorneys PLLC

(57) ABSTRACT

A sliding window assembly, a cable drive system and methods of operating the same, are disclosed. The sliding window assembly includes a guide track and a sliding window movable relative to the guide track. A heating element is coupled to the sliding window for heating the
(Continued)

sliding window. A drum of a drive assembly rotates and includes a conductive terminal connected to a power supply of the vehicle. A cable is coupled between the sliding window and heating element and the drum. The drum rotates to mechanically wind or unwind the cable for moving the sliding window. A conductive element is coupled to at least one of the drum and the cable and is electrically connected to the cable and is movable during movement of the sliding window. The conductive element contacts the conductive terminal to provide electrical current to the cable for energizing the heating element.

27 Claims, 20 Drawing Sheets

(51) Int. Cl.
    *E05F 15/643*     (2015.01)
    *E05F 11/53*     (2006.01)
    *E05F 15/60*     (2015.01)
    *B60S 1/02*     (2006.01)
    *E05D 15/06*     (2006.01)

(52) U.S. Cl.
    CPC ............ *E05F 11/535* (2013.01); *E05F 15/60* (2015.01); *E05F 15/643* (2015.01); *E05Y 2900/55* (2013.01); *H05B 2203/005* (2013.01); *H05B 2203/014* (2013.01); *H05B 2203/016* (2013.01)

(58) Field of Classification Search
    USPC .............................. 49/70, 360, 380; 219/203
    See application file for complete search history.

(56) References Cited

U.S. PATENT DOCUMENTS

| | | | |
|---|---|---|---|
| 4,496,627 A | 1/1985 | Azuma et al. | |
| 4,920,698 A | 5/1990 | Friese et al. | |
| 5,542,214 A | 8/1996 | Buening | |
| 5,613,323 A | 3/1997 | Buening | |
| 5,716,536 A | 2/1998 | Yokoto et al. | |
| 5,724,771 A | 3/1998 | Gipson | |
| 6,014,840 A | 1/2000 | Ray et al. | |
| 6,071,453 A | 6/2000 | Church | |
| 6,204,480 B1 | 3/2001 | Woodard et al. | |
| 6,255,624 B1 | 7/2001 | Boaz et al. | |
| 6,382,697 B1 | 5/2002 | Mulder et al. | |
| 6,598,931 B2 | 7/2003 | Tamura | |
| 6,766,617 B2 | 7/2004 | Purcell | |
| 7,568,312 B2 | 8/2009 | Dufour et al. | |
| 2003/0110702 A1 | 6/2003 | Capriotti et al. | |
| 2003/0182866 A1 | 10/2003 | Nestell et al. | |
| 2004/0025439 A1 | 2/2004 | Purcell | |
| 2006/0059781 A1* | 3/2006 | Berklich, Jr. | E05F 15/689 49/352 |
| 2006/0064934 A1 | 3/2006 | Vombaumen et al. | |
| 2006/0107599 A1 | 5/2006 | Luten | |
| 2006/0174544 A1 | 8/2006 | Dufour et al. | |
| 2008/0268672 A1 | 10/2008 | Sargent et al. | |
| 2010/0122495 A1 | 5/2010 | Lahnala | |
| 2010/0122496 A1 | 5/2010 | Lahnala | |
| 2010/0146859 A1 | 6/2010 | Gipson et al. | |
| 2010/0154312 A1 | 6/2010 | Gipson et al. | |
| 2011/0030276 A1* | 2/2011 | Smith | H01R 35/02 49/70 |
| 2011/0147153 A1* | 6/2011 | Rutkowski | B60S 1/56 191/12.2 R |
| 2011/0181071 A1 | 7/2011 | Schaff et al. | |
| 2012/0091113 A1* | 4/2012 | Bennett | B60J 1/1853 219/203 |
| 2012/0091114 A1 | 4/2012 | Ackerman et al. | |
| 2012/0291353 A1 | 11/2012 | Gipson et al. | |
| 2015/0298528 A1 | 10/2015 | Lahnala | |

OTHER PUBLICATIONS

International Search Report for Application No. PCT/US2011/060446 dated Feb. 17, 2012, 4 pages.
International Search Report for Application No. PCT/US2012/022973 dated Apr. 3, 2012, 3 pages.
Chomerics, "Low-Closure Force, Foam Core EMI Gaskets, Soft-Shield 4000 Series", extracted in Apr. 2013 from website: http://www.chomerics.com, pp. 1-3.
Pres-On, "Technical Data Sheet—Pres-On P9100/P9200 Tape", extracted in Apr. 2013 from website: http://www.pres-son.com, 2 pages.
English language abstract and machine-assisted English translation for FR 2 932 736 extracted from espacenet.com database on Jan. 3, 2014, 12 pages.
English language abstract and machine-assisted English translation for DE 199 30 541 extracted from espacenet.com database on Jun. 12, 2017, 14 pages.
International Search Report for Application No. PCT/US2015/052923 dated Jan. 19, 2016, 4 pages.

* cited by examiner

SLIDING WINDOW ASSEMBLY

CROSS-REFERENCE TO RELATED APPLICATIONS

This application is the National Stage of International Patent Application No. PCT/US2015/052923, filed on Sep. 29, 2015, which claims priority to and all the advantages of U.S. provisional patent application No. 62/056,923, filed Sep. 29, 2014, the disclosure of which is hereby incorporated by reference in its entirety.

BACKGROUND OF THE INVENTION

1. Field of the Invention

The subject invention generally relates to a sliding window assembly and a cable drive system and for a vehicle.

2. Description of the Related Art

Window assemblies for vehicles are known in the art. One type of window assembly includes a first panel and a second panel each fixed to the vehicle. The first and second panels are spaced from each other to define an opening therebetween. A sliding window is disposed between the first and second panels and is movable relative to the first and second panels between an open position and a closed position to selectively cover the opening. A heating grid is conventionally coupled to the sliding window for defrosting or defogging the respective sliding window. As such, electrical wiring or electrical components are necessary to energize the heating grid.

The sliding window can be opened and closed manually or automatically. When the sliding window moves automatically, a motor is typically utilized to move the sliding window between the open and closed positions. More specifically, a cable is mechanically coupled to the motor and the sliding window for moving the sliding window between the open and closed positions in response to motor movement.

In such conventional configurations, electrical wiring that is entirely separate or independent from the cable is needed to energize the heating grid. In other words, electrical current that passes to the heating grid must flow through electrical wiring that is independent of the cable that mechanically moves the sliding window. Such separate electrical wiring requires additional wiring and components thereby increasing cost to the assembly and system. Moreover, such separate electrical wiring and components reduce valuable packaging space within the vehicle.

SUMMARY OF THE INVENTION AND ADVANTAGES

One embodiment of a sliding window assembly is provided. The sliding window assembly includes a guide track adapted to be coupled to the vehicle. A sliding window is movable relative to the guide track between an open position and a closed position. A heating element is coupled to the sliding window for heating the sliding window. A drive assembly includes a drum that is configured to rotate and a conductive terminal that is connected to a power supply of the vehicle. A cable has a first end coupled to the sliding window and the heating element and a second end that is coupled to the drum. The drum is configured to rotate in a first direction to mechanically wind the cable and rotate in a second direction to mechanically unwind the cable for moving the sliding window. A conductive element is coupled to at least one of the drum and the cable. The conductive element is electrically connected to the cable and is movable during movement of the sliding window. The conductive element contacts the conductive terminal to provide electrical current to the cable for energizing the heating element for heating the sliding window.

One embodiment of a cable drive system is provided for a sliding window having a heating element for heating the sliding window. The cable drive system has a drive assembly that includes a drum that is configured to rotate and a conductive terminal connected to a power supply of the vehicle. A cable is coupled to the drum and the drum is configured to rotate in a first direction to mechanically wind the cable and rotate in a second direction to mechanically unwind the cable for moving the sliding window between an open position and a closed position. A conductive element is coupled to at least one of the drum and the cable. The conductive element is electrically connected to the cable and is movable during rotation of the drum. The conductive element contacts the conductive terminal to provide electrical current to the cable for energizing the heating element for heating the sliding window.

One embodiment of a method of operating a sliding window assembly of a vehicle is provided. The sliding window assembly includes a guide track adapted to be coupled to the vehicle. A sliding window is movable relative to the track between an open position and a closed position. A heating element is coupled to the sliding window for heating the sliding window. A drive assembly includes a drum that is configured to rotate and a conductive terminal connected to a power supply of the vehicle. A cable has a first end coupled to the sliding window and the heating element and a second end that is coupled to the drum. A conductive element is coupled to at least one of the drum and the cable. The conductive element is electrically connected to the cable. The method includes the step of rotating the drum to mechanically wind or unwind the cable for moving the sliding window. The conductive element is moved during movement of said sliding window. The conductive element contacts the conductive terminal. Electrical current is provided to the cable through the conductive element. The heating element is energized for heating the sliding window.

The sliding window assembly and the cable drive system advantageously provide the cable, which not only mechanically moves the sliding window between the open and closed position, but also transfers electrical current to the heating element of the sliding window. Thus, the cable serves a dual electro-mechanical purpose allowing elimination of separate and independent electrical wiring for energizing the heating element. Furthermore, the sliding window assembly and the cable drive system eliminate a need to have separate and independent devices to open and close the sliding window and to energize the heating element.

Electrical and moving interaction between the conductive element and the conductive terminal allows current to be transferred from the power supply to the heating element through moving parts, such as the drum or the cable. Electrical connection between the conductive terminal and the conductive element is maintained while preserving mechanical functionality of the system. That is, the conductive terminal and the conductive element are electrically connected in a moveable manner without being permanently fixed to one another. Movement of the cable or drum is not compromised. As such, energizing of the heating element is possible for any given position of the sliding window and the sliding window may be moved whether or not the heating element is being energized. Moreover, the sliding window assembly and cable drive system provide increased robustness, packaging space savings, and component reduction.

BRIEF DESCRIPTION OF THE DRAWINGS

Advantages of the subject invention will be readily appreciated, as the same becomes better understood by reference to the following detailed description, when considered in connection with the accompanying drawings.

DETAILED DESCRIPTION OF THE INVENTION

Figure 1:
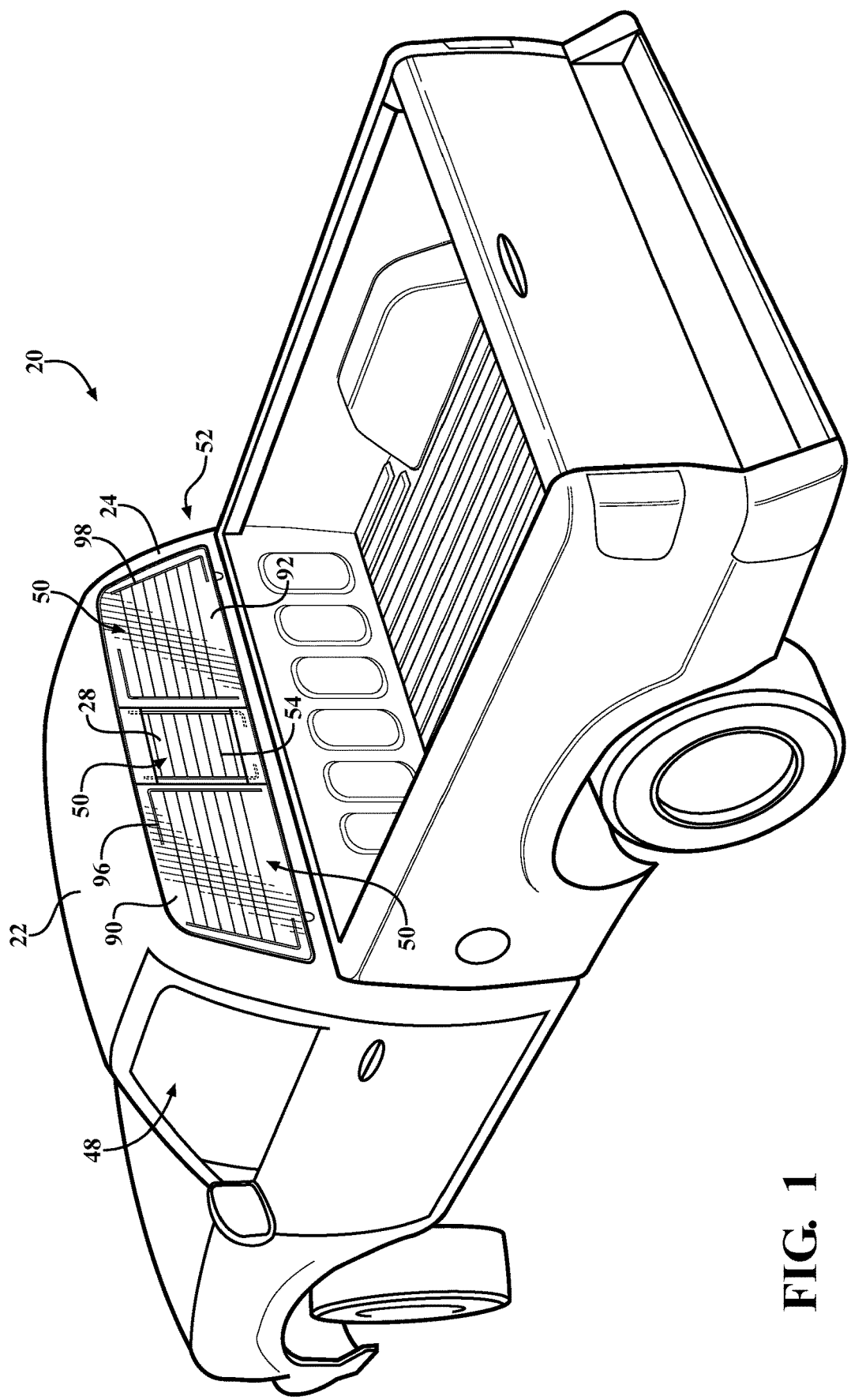
FIG. 1 is a perspective view of a sliding window assembly installed on a vehicle with a sliding window in a closed position.

Referring to the Figures, wherein like numerals indicate like or corresponding parts throughout the several views, a sliding window assembly 20 for a vehicle 22 is generally shown. Typically, as shown in FIG. 1, the sliding window assembly 20 is coupled to a rear window body 24 of a pickup truck 22. However, it is to be appreciated that the sliding window assembly 20 can be coupled to any suitable location of other types of vehicles or non-vehicles.

Figure 2:
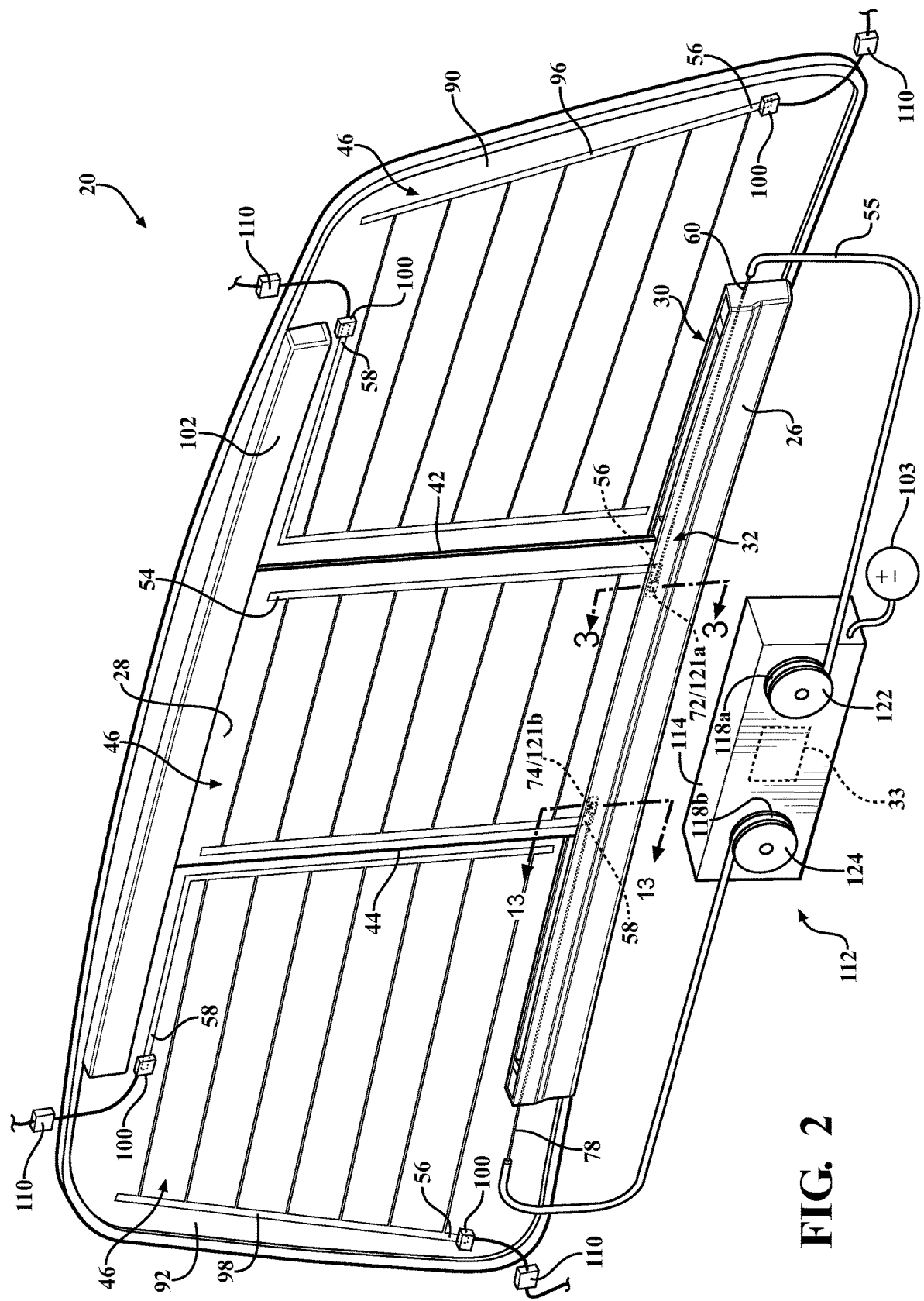
FIG. 2 is a perspective view of an interior of the sliding window assembly having a first fixed panel, a second fixed panel, and the sliding window disposed therebetween in the closed position with a cable drive system including a drive assembly having a first drum and a second drum.
Figure 3:
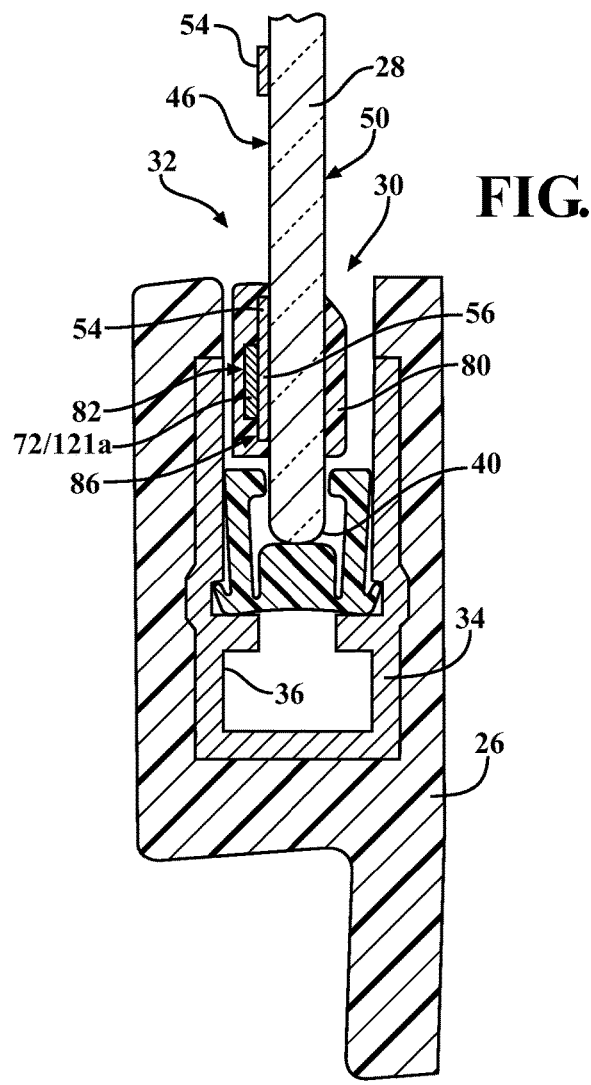
FIG. 3 is a cross-sectional view of the sliding window, a track, and a rail disposed in the track taken along line 3-3 of FIG. 2.

As best shown in FIGS. 2 and 3, the sliding window assembly 20 includes a guide track (hereinafter "track") 26 adapted to be coupled to the vehicle 22 and a sliding window 28 movably coupled to the track 26. More specifically, the track 26 defines a slot 30 for receiving and guiding the sliding window 28. The sliding window 28 includes a bottom portion 32 at least partially disposed in the track 26. The sliding window 28 is movable relative to the track 26 between an open position as shown in FIG. 4 and a closed position as shown in FIGS. 1, 2, 14A, 14B, 16-20.

Referring back to FIG. 3, optionally, a rail 34 is disposed in the slot 30 of the track 26 with the sliding window 28 movably coupled to the rail 34. More specifically, the rail 34 defines a channel 36 for receiving and guiding the sliding window 28. Typically, the bottom portion 32 of the sliding window 28 is at least partially disposed in the channel 36 of the rail 34. The rail 34 can define a generally u-shaped configuration or any other suitable configuration or orientation. The rail 34 is typically formed of a metal material. More typically, the metal material is an alloy. Suitable alloys include aluminum or iron alloys. It is to be appreciated that the rail 34 can be formed of polymeric material(s), such as plastic material(s), or any other suitable material(s). It is to further be appreciated that the rail 34, when formed of the metal material, such as the alloy, can be conductive (as discussed further below). It is also to be appreciated that the rail 34, when formed of the polymeric material, can be non-conductive. Further, if desired, strips of conductive material can be coupled to the rail 34 when formed of the non-conductive material for allowing the rail 34 to be conductive.

Figure 4:
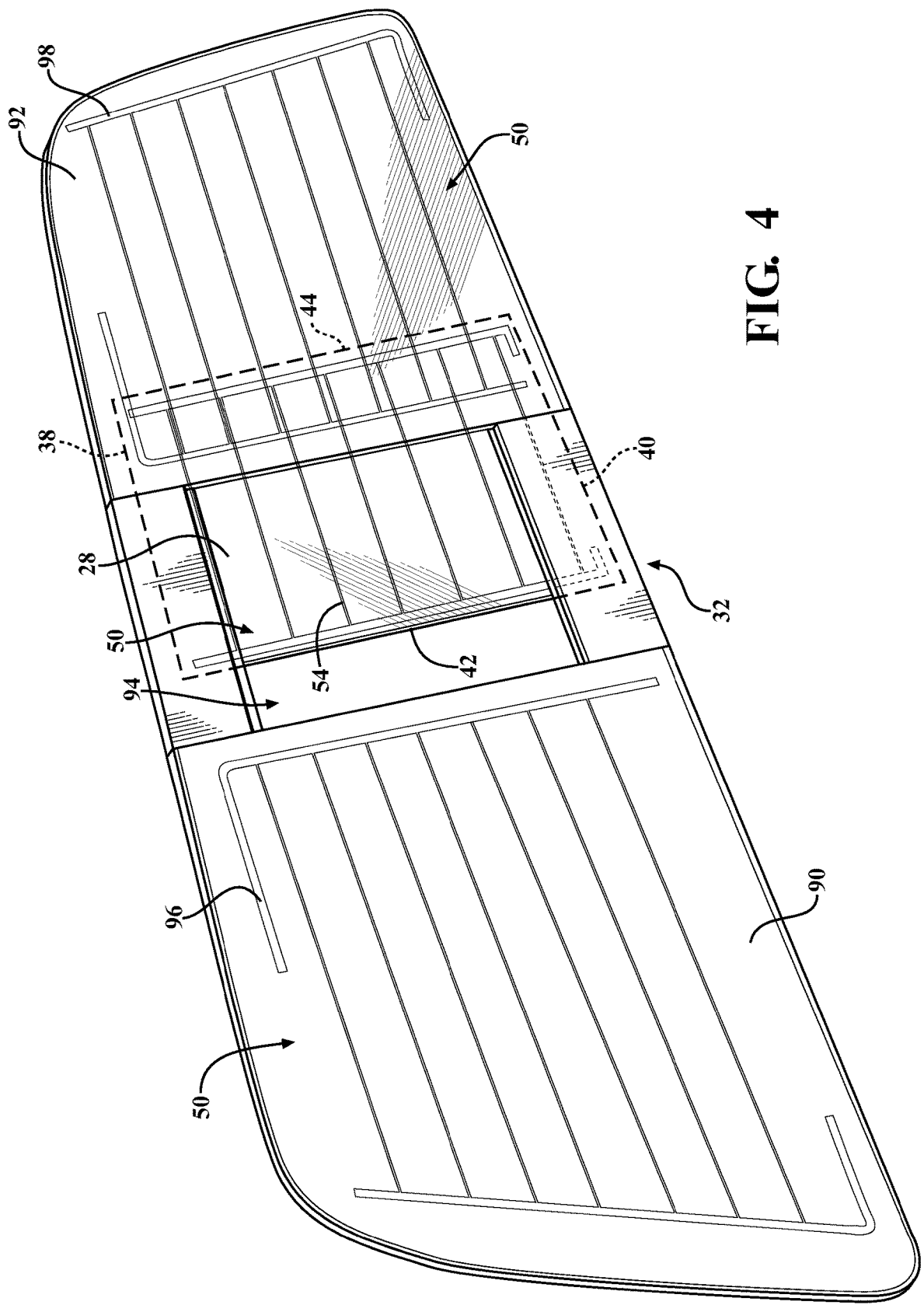
FIG. 4 is a perspective view of an exterior of the sliding window assembly having the sliding window in an open position.

Turning to FIG. 4, the sliding window 28 further includes a top edge 38 and a bottom edge 40 spaced from each other such that the top edge 38 opposes the bottom edge 40 with the bottom edge 40 disposed in the track 26. In addition, the sliding window 28 includes a left edge 42 and a right edge 44 spaced from each other such that the left and right edges 42, 44 oppose each other. More specifically, the left and right edges 42, 44 are adjacent the top and bottom edges 38, 40. The sliding window 28 has an interior surface 46 facing an interior 48 of the vehicle 22 when the sliding window assembly 20 is coupled to the vehicle 22, as best shown in FIGS. 1-3. In addition, the sliding window 28 has an exterior surface 50 opposing the interior surface 46 such that the exterior surface 50 faces an exterior 52 of the vehicle 22 when the sliding window assembly 20 is coupled to the vehicle 22 (see FIGS. 1, 3, and 4).

Referring to FIG. 2, a heating element 54 is coupled to the sliding window 28 for heating the sliding window 28. More specifically, the heating element 54 may be used to defrost or defog the sliding window 28. The heating element 54 may be coupled to any suitable surface of the sliding window 28, such as the interior surface 46. It is to be appreciated that the heating element 54 can be coupled to the exterior surface 50 of the sliding window 28 or any other suitable location. Those skilled in the art appreciate that the heating element 54 may heat the sliding window 28 for purposes other than defogging or defrosting.

In some embodiments, such as is shown in FIG. 2, the heating element 54 is an electrical grid. In such embodiments, the heating element 54 includes a first end 56 and a second end 58 spaced from each other which will be discussed further below. The electrical grid is typically formed of a conductive material, such as a conductive paste and the like. The paste can be formed of silver, ceramic, or any other suitable material(s). The paste is typically bonded to the sliding window 28. It is to be appreciated that wires or conductive film can form the heating element 54 instead of or in addition to the paste. Typically, wires are utilized with laminated glass. However, it is to be appreciated that wires can be utilized with material(s) other than laminated glass. The first and second ends 56, 58 of the sliding window 28 can be in any suitable location.

Figure 23:
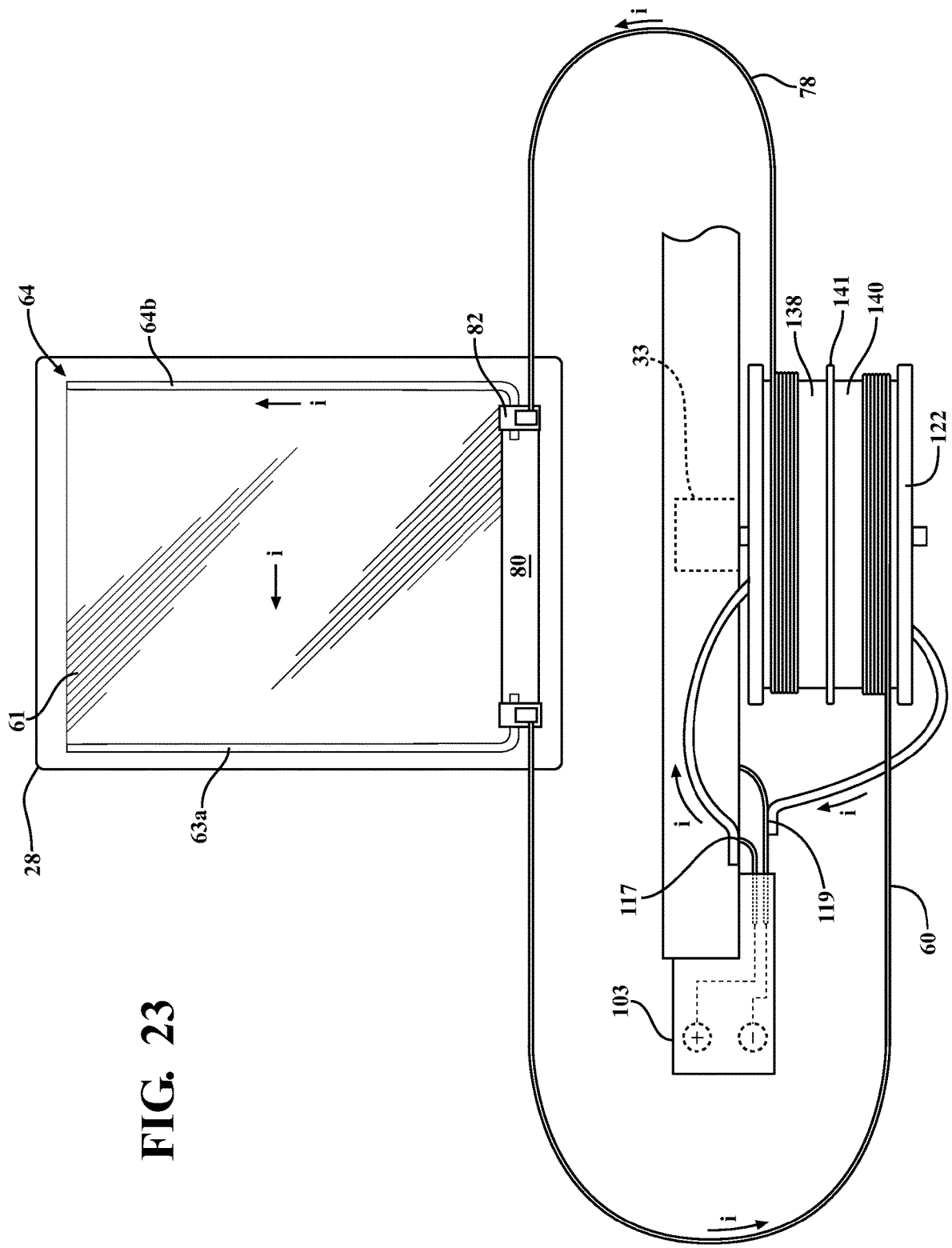
FIG. 23 is a plan view of the sliding window assembly and cable drive system according to another embodiment wherein the sliding window includes a heating element comprising a transparent layer and wherein the drum includes electrically isolated first and second portions with the first and second cables being mechanically and electrically coupled to the drum.

In other embodiments, as shown in FIG. 23, the heating element 54 is a transparent layer 61. The transparent layer 61 is disposed on the interior surface 48 or exterior surface 50 of the sliding window 28. The transparent layer 61 is transparent such that a driver or occupant of the vehicle may see through the sliding window 28 having the transparent layer 61. With the transparent layer 61 disposed within the sliding window 28, the sliding window 28 typically exhibits greater than 60 percent visible light transmission through the sliding window 28. As used herein, the term "layer" may include one or more coatings and/or films of selected composition. The coatings and/or films forming the transparent layer 61 may be single or multiple layers. The transparent layer 61 may be disposed in the sliding window 28 according to any suitable method, such as chemical vapor deposition, magnetron sputter vapor deposition, spray pyrolysis, and the like. The transparent layer 61 includes a metal compound such that the transparent layer 61 is electrically conductive. As such, the transparent layer 61 is a conductor exhibiting low electrical resistivity for effectively allowing flow of electric current therethrough. Preferably, the metal compound includes a metal oxide. However, the metal compound may also include a metal nitride, and the like. The metal oxide may include a tin oxide, such as indium tin oxide, or the like. The transparent layer 61 may include other metal oxides, including, but not limited to, silver oxide. The metal compound may also be doped with an additive, such as fluorine. Specifically, the additive may be included in the metal compound to optimize the light transmittance, durability, and electrical resistivity of the transparent layer 61. The transparent layer 61 preferably has a sheet resistance in a range between 0.5-20 $\Omega$/square. More preferably, the transparent layer 61 has a sheet resistance in a range between 0.7-3 $\Omega$/square. The sheet resistance may also be known as a surface resistance of the transparent layer 61. When electrical current passes through the transparent layer 61, the transparent layer 61 energizes and heats up thereby providing functionality as a defrosting or defogging element. The transparent layer 61 may occupy any suitable portion of a surface area of the sliding window 28.

Figure 5:
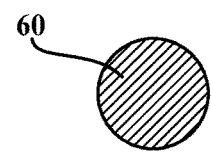
FIG. 5 is a cross-sectional view of a cable according to one embodiment.
Figure 7:
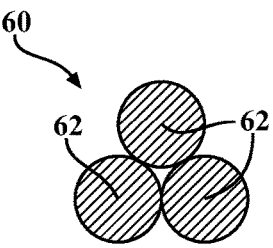
FIG. 7 is a cross-sectional view of the cable according to another embodiment wherein the cable includes a plurality of strands.
Figure 8:
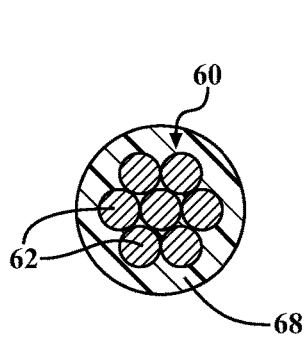
FIG. 8 is a cross-sectional view of a sheath surrounding the cable according to one embodiment.
Figure 9:
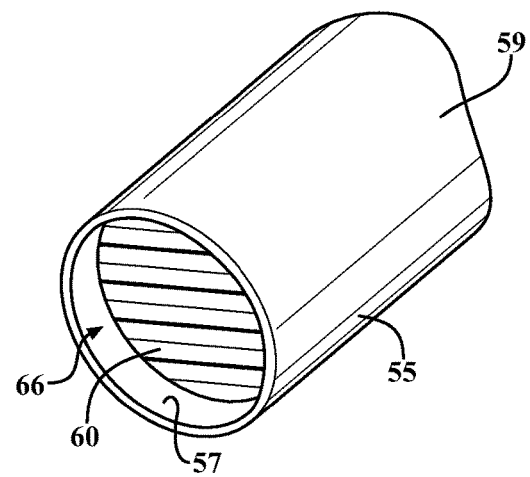
FIG. 9 is a broken cross-sectional perspective view of a conduit surrounding the cable according to one embodiment.
Figure 10:
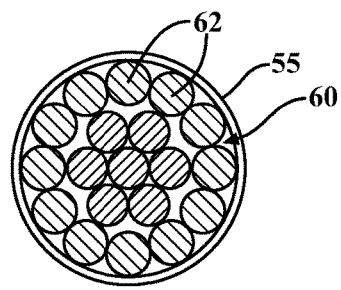
FIG. 10 is a cross-sectional view of the conduit surrounding the cable having a plurality of different sized strands according to one embodiment.

The sliding window assembly 20 further includes a cable 60 coupled to the sliding window 28 for moving the sliding window 28 between the open and closed positions. As shown in FIGS. 5 and 9, the cable 60 may include one strand 62. Alternatively, as shown in FIGS. 7, 8, and 10, the cable 60 may include a plurality of strands 62. The strand 62 or strands 62 form the core of the cable 60. The cable 60 may include any suitable number of strands 62. The cable 60 may have an R×S configuration where "R" represents a number of ropes and "S" represents the number of strands per rope. For example, the cable 60 may have a 1×S configuration such that the cable 60 has a single rope. In one example, as shown in FIG. 8, the cable has a 1×7 construction such that the cable 60 has a single rope including 7 strands (7 strands total). In another example, as shown in FIG. 10, the cable 60 has a 1×19 configuration such that the cable 60 has the single rope including 19 strands (19 strands total). In yet another embodiment, "R" may be greater than one such the cable 60 includes many ropes. For example, the cable 60 may have a 7×7 configuration wherein the cable 60 includes 7 ropes with each rope including 7 strands (49 total strands).

Figure 6:
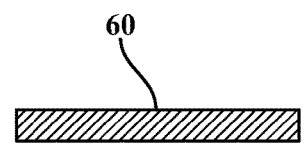
FIG. 6 is a cross-sectional view of the cable according to another embodiment.

Each strand 62 may have any suitable cross-sectional diameter. Depending on the configuration of the cable 60, each of the strands 62 may have the same cross-sectional diameter, as shown in FIG. 8 for example. Alternatively, as shown in FIG. 10, for example, different strands 62 may have different cross-sectional diameters. The plurality of strands 62 may be intertwined to define a braided cable. In other examples, the plurality of strands 62 may be concentrically disposed such that the strands 62 are generally disposed in parallel with another rather than being intertwined. The strand 62 or plurality of strands 62 may have any suitable cross-section, such as a circular cross-section, rectangular cross-section, square cross-section, and the like. For example, as shown in FIG. 6, the cable 60 has a flat, rectangular, cross-section. Those skilled in the art appreciate the core of the cable 60 may have other strand arrangements not specifically recited herein and that different configurations may be more suitable depending on the application.

The cable 60 is configured to undergo mechanical force to move the sliding window 28. As is described in detail below, the cable 60 is pulled or pushed causing the cable 60 to undergo tension or compression, respectively. Specifically, the cable 60 undergoes tension or compression to move the sliding window 28. The mechanical force is applied to the strand 62 or strands 62 of the cable 60. That is, the strand 62 or strands 62 undergo tension or compression. When the cable 60 includes one strand 62, the mechanical force is applied to the one strand 62. When the cable 60 includes more than one strand 62, the mechanical force is applied through the strands 62 collectively. The load may be shared between the strands 62. The cable 60 remains mechanically coupled to the sliding window 28 in both the open and closed positions.

The cable 60, and more specifically, the strand or strands 62 collectively, exhibit any suitable load bearing properties, such as breaking strength, to allow the cable 60 to move the sliding window 28. For example, the breaking strength of the cable 60 may be 50 lbs, 100 lbs, 500 lbs, 1000 lbs, 2000 lbs, and the like. This breaking strength allows the cable 60 to undergo mechanical force to move the sliding window 28. Thus, the cable 60 exhibits sufficient mechanical strength to move the sliding window 28.

The breaking strength of the cable 60 is much greater than breaking strengths of conventional SAE electrical wire wherein, for example, the breaking strength of 18 gauge electrical wire is about 38 lbs, and the breaking strength of 22 gauge electrical wire is about 15 lbs. Such load bearing properties of conventional electrical wires may be insufficient and unsuitable to bear loads required to move the sliding window 28. Those skilled in the art appreciate the cable 60 may exhibit other load bearing related properties that are distinguished from conventional electrical wires, such as tensile strength, density, elasticity, and the like.

In addition to being coupled to the sliding window 28, the cable 60 is further coupled to the heating element 54. The cable 60 is configured to transfer electrical current to energize the heating element 54. The cable 60 functions both to move the sliding window 28 between the open and closed positions and to supply electrical energy to energize the heating grid 54 of the sliding window 28. The heating element 54 is energized via the cable 60 that moves the sliding window 28. The cable 60, therefore, serves a dual electro-mechanical purpose. In other words, the cable 60 that moves the sliding window 28 is the same cable 60 that transfers electrical current to the heating element 54. Those skilled in the art appreciate that the cable 60 may transfer electrical current and transfer mechanical load at different points along the cable 60. In other words, a point on the cable 60 that is electrically connected to the heating element 54 may not necessarily transfer the mechanical load. Similarly, a point on the cable 60 that transfers mechanical load, e.g., near the bracket 80 described below, need not also transfer electrical current to the heating element 54. In other instances, however, it is envisioned that mechanical load and electrical current and transmitted through a common point of the cable 60.

Electrical current is shown throughout the Figures as "i" and the direction of the flow of the electrical current is indicated with an arrow. Those skilled in the art appreciate that the flow of electrical current, as illustrated, is based on conventional current flow (i.e., positive to negative). Of course, electrons may flow from negative to positive depending on whether electron charge flow convention is used.

Thus, electrical wiring separate and independent from the cable 60 is not required to transfer electrical current to the heating element 54. The cable 60 as described herein eliminates the need for a separate electrical wire disposed alongside and moving concurrently with the cable.

The cable 60 is electrically conductive. In other words, the cable 60 is a conductor that allows the flow of electrical current along its length. When the cable 60 includes one strand 62, the electrical current is transferred through the one strand 62. When the cable 60 includes more than one strand 62, the electrical current is transferred through the strands 62 collectively. Conductivity of the cable 60 allows the cable 60 to transfer electrical current to energize the heating element 54. The cable 60 remains electrically coupled to the heating element 54 in both the open and closed positions.

The cable 60 may be formed of any suitable material for withstanding appropriate mechanical loads and for allowing appropriate transfer of electrical current. In other words, the cable 60 may have any suitable electrical or compositional properties for sufficiently enabling the cable 60 to both undergo mechanical force and transfer electrical current. For example, the cable 60 may be formed of metal material(s), such as, for example copper, steel or any other suitable conductive material(s). The cable 60 may be coated with zinc or any other suitable coating(s). For example, in one example, the cable 60 is zinc coated and steel braided.

The cable 60 exhibits any suitable conductivity or resistivity to allow transfer of electrical current. For example, at 20 degrees Celsius, the cable 60 may exhibit a conductivity of greater than $1\times10^7$ S/m, greater than $3\times10^7$ S/m, or greater than $6\times10^7$ S/m. Similarly, the cable 60 exhibits any suitable resistivity to allow transfer of electrical current. For example, the cable 60 may exhibit resistivity of less than 20 $\Omega$/m, less than 10 $\Omega$/m, less than 1 $\Omega$/m, and the like. In spite of having breaking strength much greater than conventional electrical wire, the cable 60 exhibits conductivity that is comparable to the conductivity of conventional electrical wire.

As shown in FIGS. 9 and 10, a conduit (or outer sheath) 55 may surround the cable 60. In other words, the conduit defines a hollow 66 receiving the cable 60 with the conduit 55 surrounding the cable 60. Specifically, the conduit 55 has an interior surface 57 surrounding the cable 60 and an exterior surface 59 being exposed. The cable 60 is disposed in the conduit 55. In one embodiment, the cable 60 is slidable relative to the conduit 55. Generally, the cable 60 is the sole component within the conduit 55 configured to transfer electrical current to energize the heating element 54 or to undergo mechanical force to move the sliding window 28. The conduit 55 functions to protect the cable 60 from environmental conditions and physical damage. The conduit 55 may also protect the cable, which transfers electrical current, from contacting other conductive vehicle structures that are electrically connected to the vehicle's electrical ground. In instances where the cable 60 is connected to the power supply 103 ground (−), the cable 60 may be without the conduit 55 as risk of short circuit is minimized. The conduit 55 may be formed of any suitable material, such as a polymeric material and the like.

In some embodiments, a sheath (or inner sheath) 68 may surround the cable 60. In one example, as shown in FIG. 8, the sheath 68 is disposed or sandwiched between the cable 60 and the conduit 55. In one embodiment, the cable 60 is slidable relative to the sheath 68. The sheath 68 can be formed of polymeric material(s). The polymeric material(s) can be further defined as plastic material(s). The sheath 68 can be formed of thermoplastic, polyethylene, nylon, polyvinyl chloride (PVC), and any other suitable material(s). The sheath 68 may be used to hold the strands 62 in place and protect other components of the sliding window assembly 20 and the vehicle 22 from conducting electrical current from the strands 62. Alternatively or additionally, the sheath 68 may function to reduce friction between the cable 60 and the conduit 55. In other embodiments, more than one sheath 68 may surround the cable 60.

Figure 11:
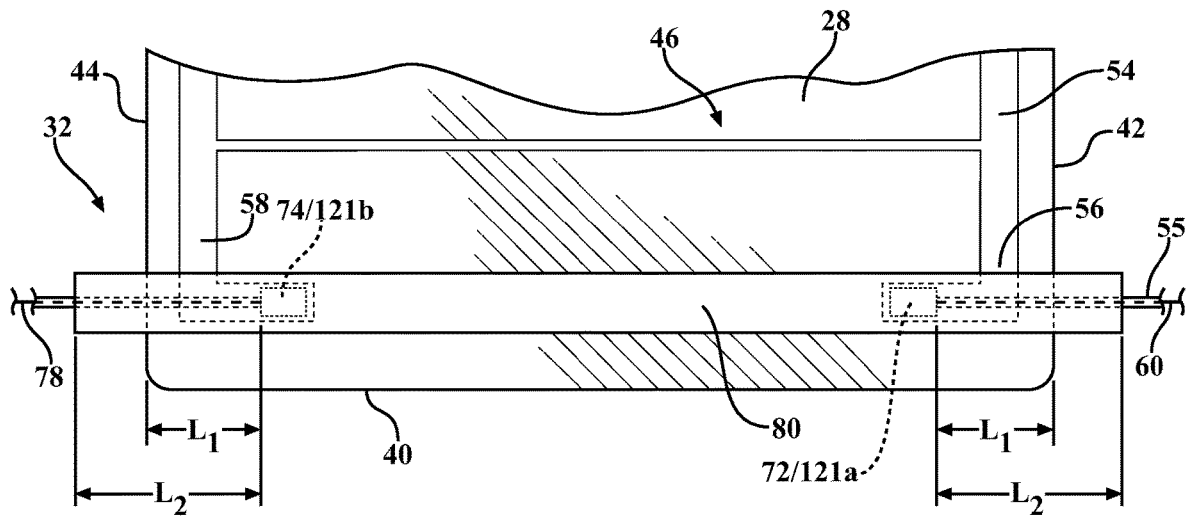
FIG. 11 is a broken plan view of the sliding window with a bracket coupled to a bottom portion of the sliding window with the cable coupled to the bracket.

As best shown in FIGS. 2 and 11, in one embodiment, the cable 60 includes a first terminal end 72 coupled to the first end 56 of the heating element 54 and a second terminal end 74 coupled to the second end 58 of the heating element 54 for electrically connecting the heating element 54 to the cable 60. The terminal ends 72, 74 are electrically conductive to allow electrical current to pass from cable 60 through the terminal ends 72, 74 and vice versa. The first and second terminals 72, 74 may be additionally configured to withstand mechanical loads for moving the sliding window 28. In one embodiment, the first and second terminal ends 72, 74 extend outwardly away from the cable 60 to enable the first and second terminal ends 72, 74 to be exposed to the first and second ends 56, 58 of the heating element 54, respectively. The first and second terminal ends 72, 74 may extend beyond the conduit 55 and the sheath 68 to enable the first and second terminal ends 72, 74 to be exposed to the first and second ends 56, 58 of the heating element 54, respectively. It is to be appreciated that the cable 60 can be any suitable configuration or orientation or location for electrically connecting to the heating element 54.

The first and second terminal ends 72, 74 are coupled to the first and second ends 56, 58 of the heating element 54 of the sliding window 28, respectively by any appropriate method, such as soldering, welding, adhesive, conductive epoxy, and the like.

In certain alternatives, the cable 60 is further defined as a first cable 60 for moving the sliding window 28 to the closed position and the sliding window assembly 20 further includes a second cable 78 for moving the sliding window 28 to the open position. The second cable 78 includes characteristics, properties, and features similar to the first cable 60, as described above. The first cable 60 is coupled to the first terminal end 72 and the second cable 78 is coupled to the second terminal end 74. Thus, the terminal ends 72, 74 may be part of the first cable 60 or shared between the first and second cables 60, 78.

The first terminal end 72 extends outwardly away from the first cable 60 to enable the first terminal end 72 to be exposed to the first end 56 of the heating element 54. Likewise, the second terminal end 74 extends outwardly away from the second cable 78 to enable the second terminal end 74 to be exposed to the second end 58 of the heating element 54. The first and second terminal ends 72, 74 can be coupled to the heating element 54 of the sliding window 28 at any suitable location.

Figure 22:
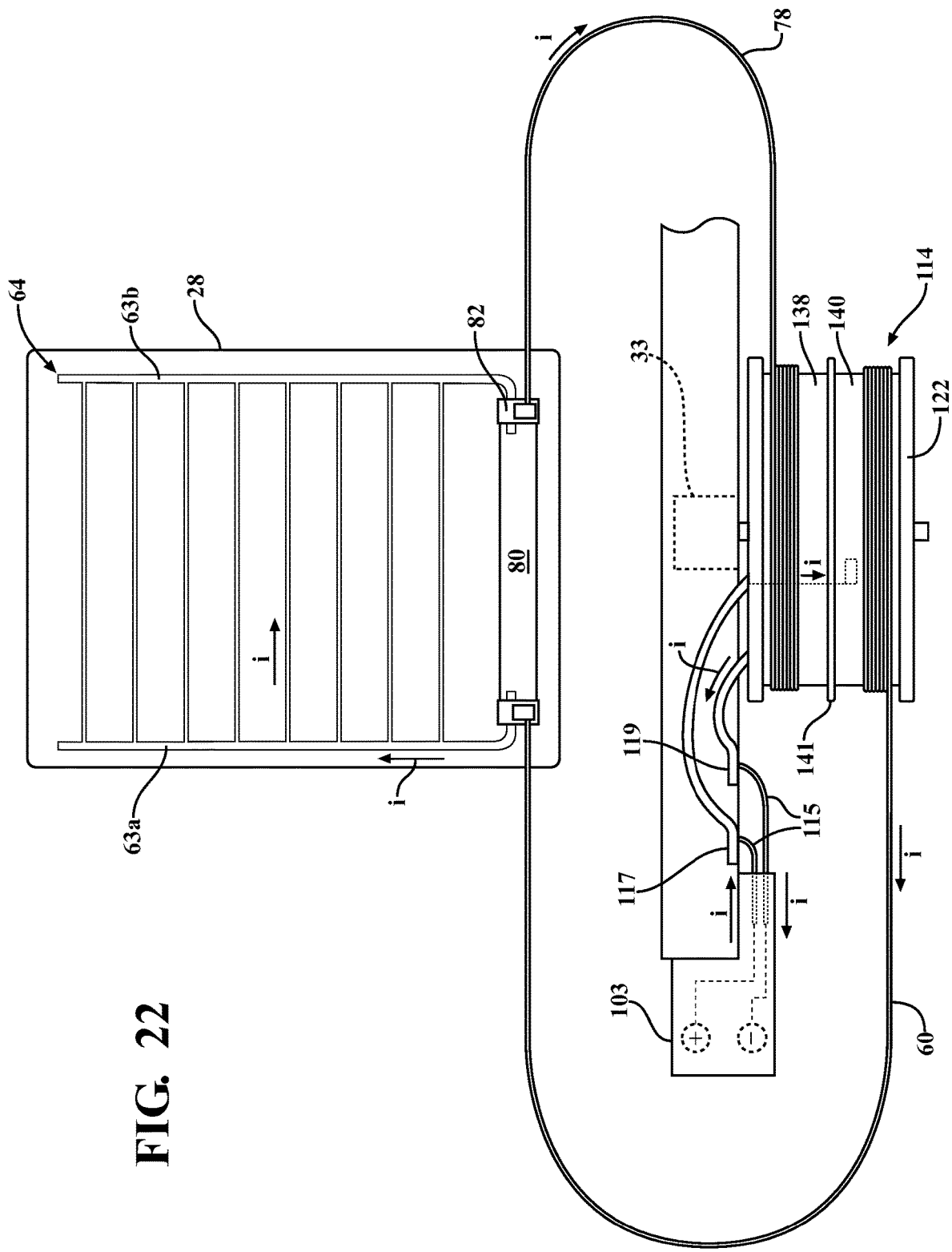
FIG. 22 is a plan view of the sliding window assembly and cable drive system according to one embodiment wherein the sliding window includes an electrical heating grid and wherein the drum includes electrically isolated first and second portions with the first and second cables being mechanically and electrically coupled to the drum.
Figure 24:
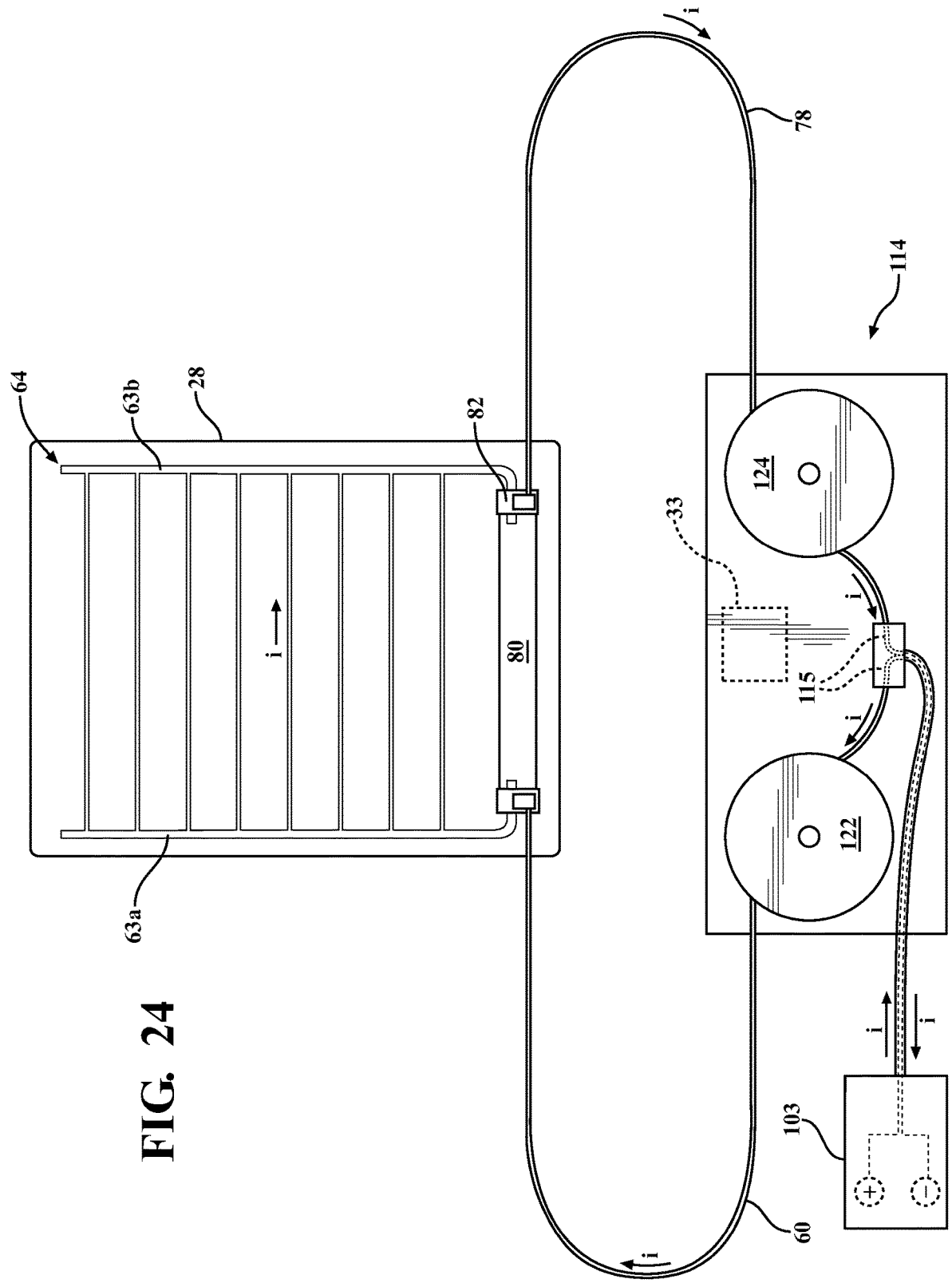
FIG. 24 is a plan view of the sliding window assembly and cable drive system according to yet another embodiment wherein the sliding window includes the first cable mechanically and electrically coupled to the first drum and the second cable mechanically and electrically coupled to the second drum.

The sliding window 28 may include at least one bus bar 63 disposed on the sliding window 28. The bus bar 63 comprises a conductive strip or bar for conducting electrically to the heating element 54. The bus bar 63 may be comprised of any conductive material, such as copper paste, and the like. In one example, as shown in FIGS. 22-24, a first bus bar 63a is disposed adjacent the left edge 42 of the sliding window 28 and a second bus bar 63 is disposed adjacent the right edge 44 of the sliding window 28. More specifically, the first bus bar 63a is disposed adjacent the first end 56 of the heating element 54 and the second bus bar 63b is disposed adjacent the second end 58 of the heating element 54. Depending on the application, the first and second bus bars 63a, 63b are electrically coupled to the electrical grid or the transparent layer 61.

The cable 60 may be coupled to the heating element 54 according to various embodiments. The cable 60 may be directly or indirectly coupled to the heating element 54. When directly coupled to the heating element 54, the cable 60 is in direct abutting connection with the heating element 54. When indirectly coupled to the heating element 54, there exists an intermediary conductive member between the cable 60 and the heating element 54. For example, the cable 60 may be coupled to the heating element 54 via the bus bars 63a, 64b. The first and second bus bars 63a, 63b may be electrically coupled to the cable 60, and more specifically, the first and second cables 60, 78. The first terminal end 72 may be coupled to the first bus bar 63a and the second terminal end 74 may be coupled to the second bus bar 63b. The first and second terminal ends 72, 74 may be coupled to the first and second bus bars 63a, 63b according to any suitable method, such as soldering and the like. The first and second terminal ends 72, 74 may be directly or indirectly coupled electrically with the first and second bus bars 63a, 63. Those skilled in the art realize that the cable 60 may be coupled to the heating element 54 according to various other configurations not specifically described herein.

In one example, electrical current passes through the first cable 60 to the first terminal 72 to the first bus bar 63a to the heating element 54. After passing through the heating element 54, electrical current then passes to the second bus bar 63b, to the second terminal end 74 to the second cable 78. Depending on power supply polarity, the path of the electrical current may be opposite as described.

Figure 12:
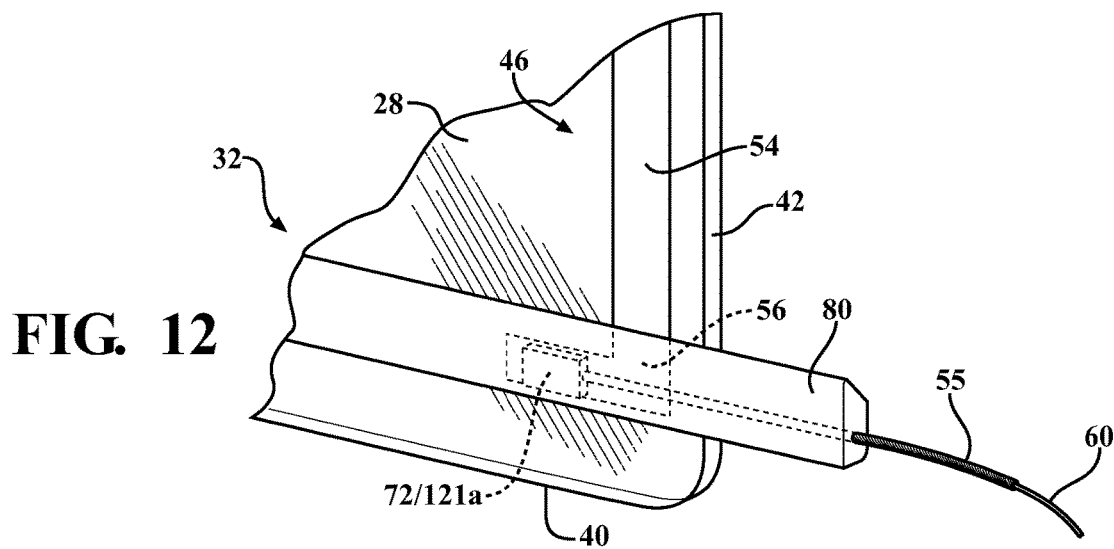
FIG. 12 is a broken perspective view of the sliding window with the bracket coupled to the bottom portion of the sliding window with the cable coupled to the bracket.

In another embodiment, as best shown in FIGS. 3, 11, and 12, the sliding window assembly 20 further includes a bracket 80 coupled to the sliding window 28 with the cable 60 coupled to the bracket 80. More specifically, the bracket 80 is coupled to the bottom portion 32 of the sliding window 28. In one alternative, the bracket 80 is coupled to the sliding window 28 proximal to the bottom edge 40 of the sliding window 28. It is to be appreciated that the bracket 80 can be coupled to the sliding window 28 in any suitable location. Typically, the first and second cables 60, 78 are coupled to the bracket 80 to enable the first and second cables 60, 78 to move the bracket 80, which moves the sliding window 28 between the open and closed positions. The bracket 80 transfers the force from the cable 60 to the sliding window 28 for moving the sliding window 28 within the track 26.

The bracket 80 may be disposed in the channel 36 of the rail 34 such that the bracket 80 is hidden from a user's sight. The bracket 80 is substantially parallel to the bottom edge 40 of the sliding window 28 and typically spans a substantial majority or an entirety of the length of the sliding window 28. Said differently, the bracket 80 runs along the bottom portion 32 of the sliding window 28 and may extend past both the left and right edges 42, 44 of the sliding window 28, as shown in FIG. 11.

The first and second cables 60, 78 each define a first predetermined length $L_1$ overlapping the sliding window 28 to electrically connect to the heating element 54, and more specifically, to electrically connect the first and second terminal ends 72, 74 to respective first and second ends 56, 58 of the heating element 54. In addition, the first and second cables 60, 78 each define a second predetermined length $L_2$ disposed within the bracket 80 such that the bracket 80 supports the first and second cables 60, 78 as the cables 60, 78 move the bracket 80 that moves the sliding window 28 between the open and closed positions. Typically, the second predetermined length $L_2$ is greater than the first predetermined length $L_1$. It is to be appreciated that the first predetermined length $L_1$ can be equal to the second predetermined length $L_2$ or the first predetermined length $L_1$ can be greater than the second predetermined length $L_2$.

Figure 13:
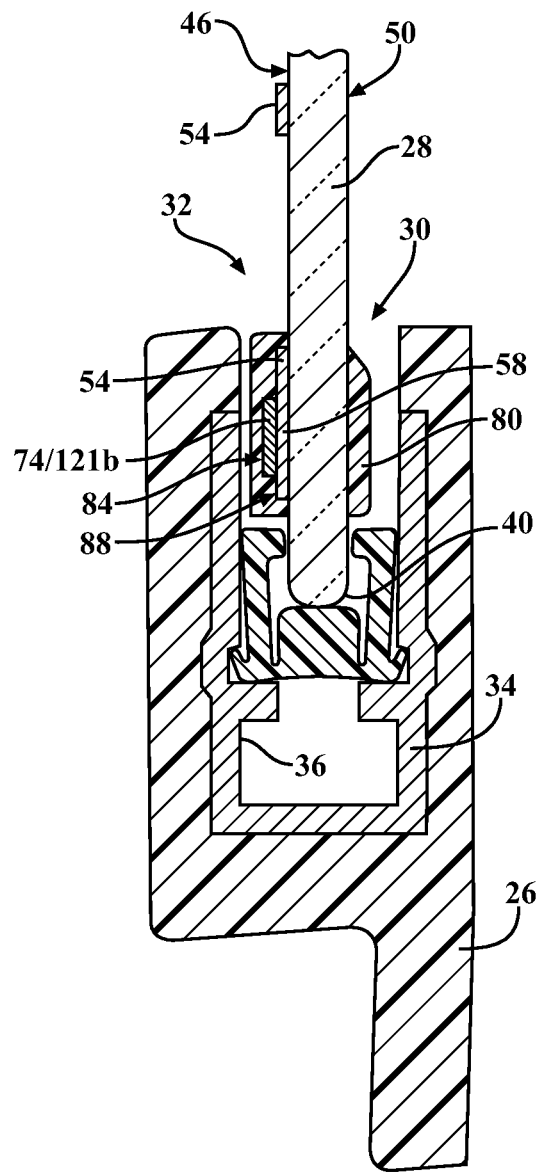
FIG. 13 is a cross-sectional view of the sliding window, the track, and the rail disposed in the track taken along line 13-13 of FIG. 2.

Referring to FIG. 3, the bracket 80 defines a first pocket 82 receiving the first terminal end 72 for positioning the first terminal end 72 into engagement with the first end 56 of the heating element 54. Referring to FIG. 13, the bracket 80 further defines a second pocket 84 receiving the second terminal end 74 for positioning the second terminal end 74 into engagement with the second end 58 of the heating element 54. The first and second pockets 82, 84 may receive the first and second terminal ends 72, 74 for positioning the first and second terminal ends 72, 74 with the first and second bus bars 63a, 63b. As shown in FIG. 3, the bracket 80 also defines a first groove 86 adjacent the first pocket 82 for receiving the first end 56 of the heating element 54. As shown in FIG. 13, the bracket 80 also defines a second groove 88 adjacent the second pocket 84 for receiving the second end 58 of the heating element 54.

The bracket 80 may be coupled to the sliding window 28 by any suitable method, such as, for example, encapsulation, molding, bonding, etc. Generally, encapsulation results in an encapsulant that can be used to couple the bracket 80 to the sliding window 28. In addition, encapsulation can be further defined as single-sided encapsulation, two-sided encapsulation, or three-sided encapsulation. For example, with single-sided encapsulation, the bracket 80 is coupled to the interior surface 46 of the sliding window 28 leaving the exterior surface 50 of the sliding window 28 free of the encapsulant. When encapsulation is employed, the bracket 80 is formed, at least partially, from the encapsulant. More specifically, with respect to encapsulation, the bracket 80 is formed of the encapsulant and is coupled to the sliding window 28 by encapsulation. It is to be appreciated that any type of encapsulation or adhesive surface bonding can be utilized for coupling the bracket 80 to the sliding window 28.

The bracket 80 is typically coupled to the interior surface 46 of the sliding window 28. More typically, three-sided encapsulation is utilized which results in the bracket 80 being disposed on both the interior and exterior surfaces 46, 50 of the sliding window 28 and both the left and right edges 42, 44 of the sliding window 28. Three-sided encapsulation increases a surface area of the sliding window 28 that the bracket 80 is coupled to while limiting a size of the bracket 80. Increasing the surface area in turn increases the bond strength between the bracket 80 and the sliding window 28 while also limiting the size of the bracket 80 to provide an aesthetically pleasing appearance. It is to be appreciated that the bracket 80 can be coupled to only the interior surface 46 or only the exterior surface 50 of the sliding window 28. Alternatively, the bracket 80 can be coupled to one of the interior and exterior surfaces 46, 50 of the sliding window 28 and one of the left and right edges 42, 44 of the sliding window 28. Furthermore, the bracket 80 can be coupled to both the interior and exterior surfaces 46, 50 and one of the left and right edges 42, 44.

When utilizing encapsulation for the bracket 80, the encapsulant is typically formed of plastic material(s) and more typically, thermoplastic material(s) or thermoset material(s). Even more typically, the bracket 80 is formed of an isocyanate component and an isocyanate-reactive component. In certain embodiments, the bracket 80 is formed of polyurethane. One example of a suitable polyurethane is commercially available from BASF Corporation under the trade name of COLO-FAST™, e.g. COLO-FAST™ LM-161. It is to be appreciated that the encapsulant can be formed from various plastic material(s), such as, for example, nylon; acrylonitrile butadiene styrene (ABS); polybutylene terephthalate (PBT); polyvinyl chloride (PVC), thermoplastic elastomers (TPE); elastomeric alloys, e.g. thermoplastic vulcanizates (TPV); thermoplastic polyolefins (TPO); thermoplastic styrene (TPS); and various different types of reaction injection molding (RIM) materials; or any other suitable material(s) for encapsulation. It is to be appreciated that any other suitable material(s) can be utilized for forming the bracket 80. It is to also be appreciated that thermoplastics, such as nylon, ABS, or PBT can be utilized to form the bracket 80 as set forth above and can be bonded to the interior or exterior surfaces 46, 50 of the sliding window 28. It is to be appreciated that a primer can be applied to the sliding window 28 prior to molding the bracket 80 for increasing the bond strength between the bracket 80 and the sliding window 28. Alternatively, the bracket 80 can be molded without the sliding window 28 present and subsequently coupled to the sliding window 28 by an adhesive.

In certain embodiments, as shown in FIGS. 1, 2, 4, 14A, 14B, 16-20, the sliding window assembly 20 further includes a first fixed panel 90 adapted to be fixed to the vehicle 22 and a second fixed panel 92 adapted to be fixed to the vehicle 22. The second fixed panel 92 is spaced from the first fixed panel 90 to define an opening 94 therebetween. The sliding window 28 covers the opening 94 when in the closed position as shown in FIGS. 1, 2, 14A, 14B, 16-20 and the sliding window 28 uncovers the opening 94 when in the open position as shown in FIG. 4. It is to be appreciated that the sliding window 28 is in the open position when the sliding window 28 is partially covering the opening 94. In other words, the sliding window 28 is in the open position when the sliding window 28 is completely or partially uncovering the opening 94. As such, the sliding window 28 is in the closed position when the sliding window 28 completely covers the opening 94.

Referring to FIGS. 1, 2, 4, 14A, 14B, 16-20, the first and second fixed panels 90, 92 each have an interior surface 46 facing the interior 48 of the vehicle 22 when the sliding window assembly 20 is coupled to the vehicle 22. Further, the first and second fixed panels 90, 92 each have an exterior surface 50 opposing the interior surface 46 such that the exterior surface 50 faces the exterior 52 of the vehicle 22 when the sliding window assembly 20 is coupled to the vehicle 22. As such, the interior surface 46 of each of the panels 28, 90, 92 face the interior 48 of the vehicle 22 and the exterior surface 50 of each of the panels 28, 90, 92 face the exterior 52 of the vehicle 22.

The first and second fixed panels 90, 92 and the sliding window 28 may be each formed of glass. However, it is to be appreciated that the first and second fixed panels 90, 92, as well as the sliding window 28, can each be formed from plastic material(s); metal material(s); glazing material(s), such as, for example, polymer glazing, laminated glass, tempered glass or any other suitable material(s).

A left heating element 96 is coupled to the first fixed panel 90 for defrosting or defogging the first fixed panel 90 and a right heating element 98 is coupled to the second fixed panel 92 for defrosting or defogging the second fixed panel 92. It is to be appreciated that the heating element 54 of the sliding window 28 can be referred to as a center heating element 54.

Figure 16:
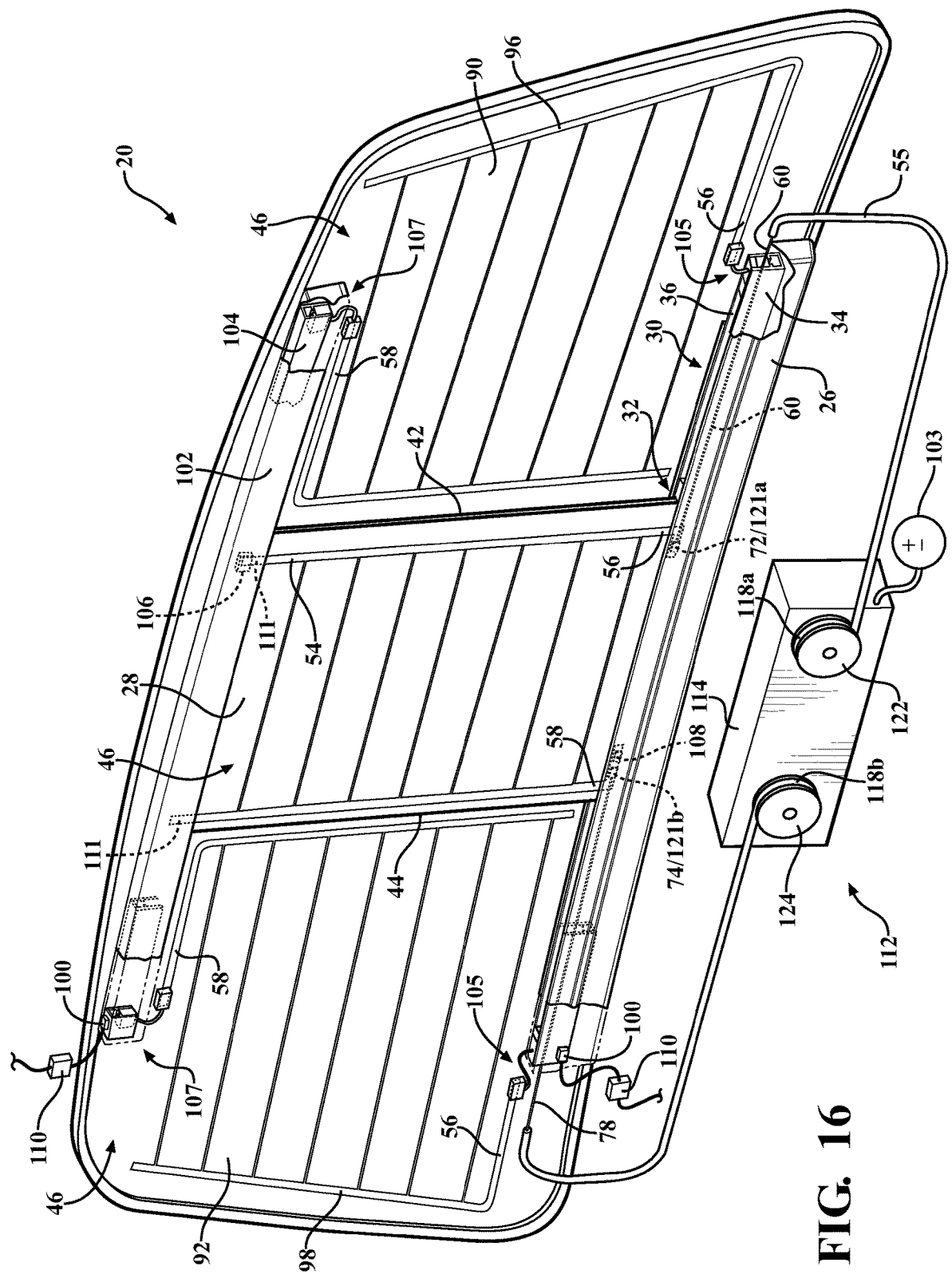
FIG. 16 is a perspective view of an interior of another sliding window assembly with the first and second conductive rails and the cable drive system having the first and second drums with a second upper connector and a second lower connector coupled to the sliding window.
Figure 17:
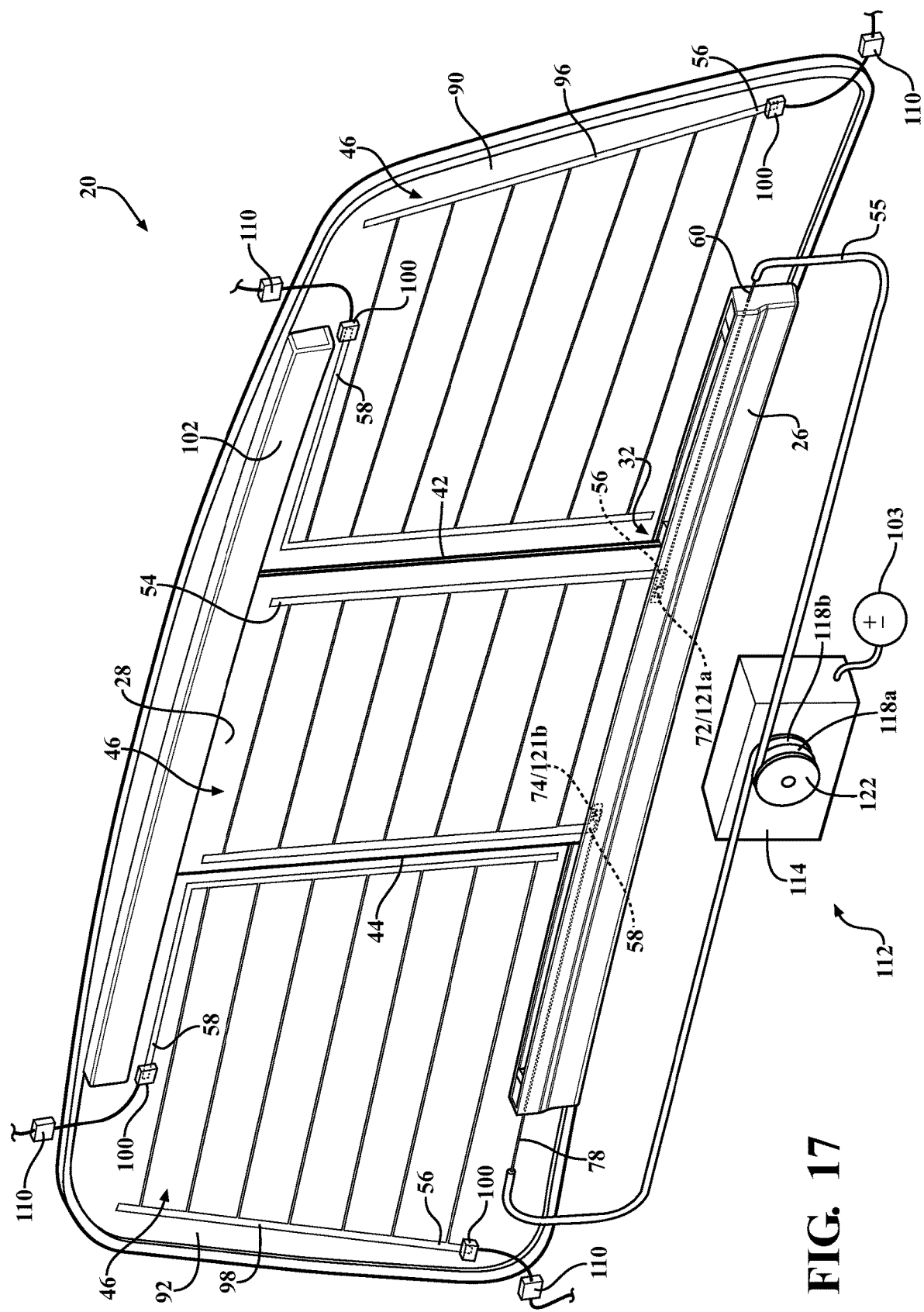
FIG. 17 is a perspective view of the interior of the sliding window assembly and another cable drive system including a drive assembly having a first drum with a first cable and a second cable each coupled to the first drum.
Figure 18:
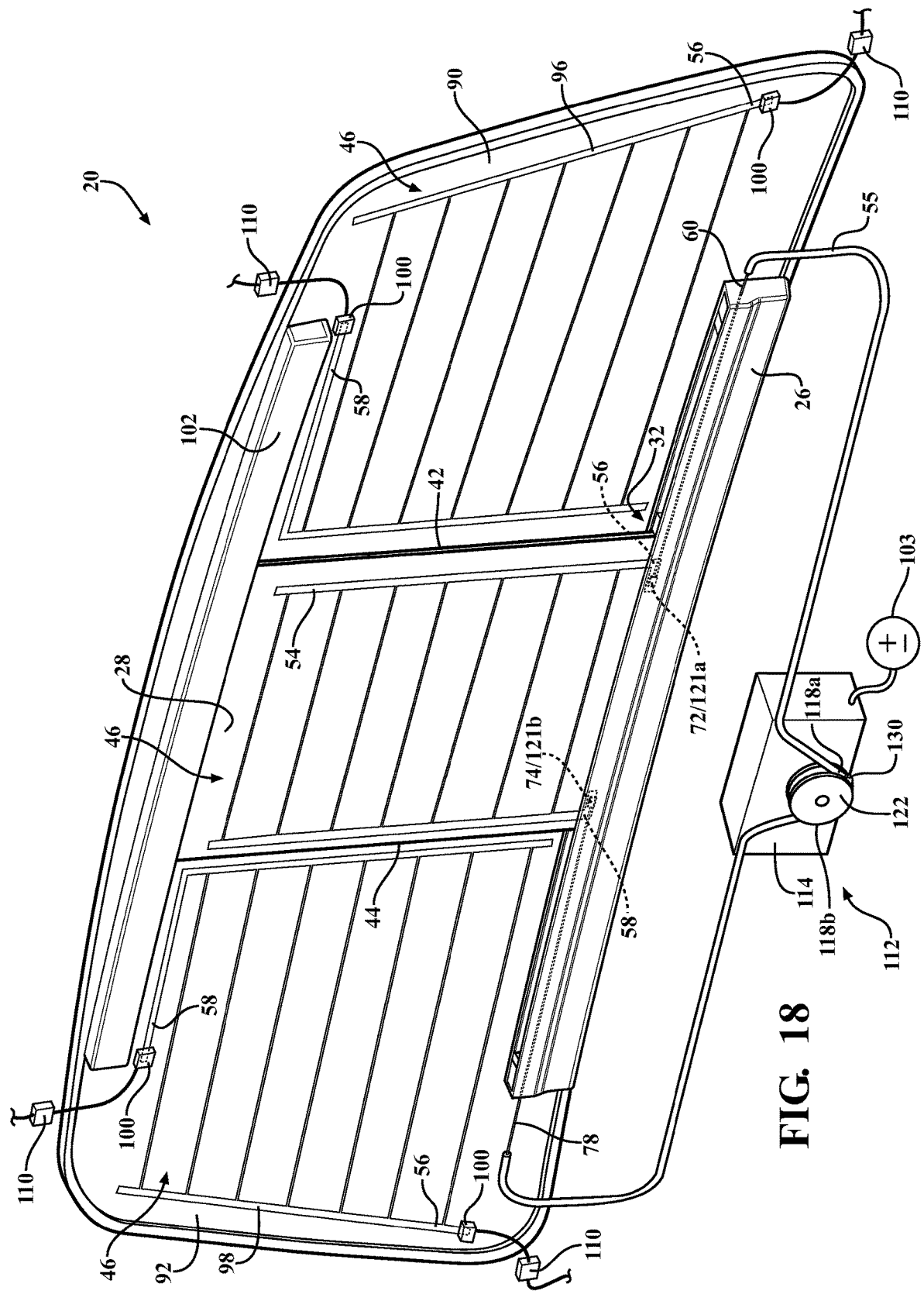
FIG. 18 is a perspective view of an interior of a sliding window assembly and yet another cable drive system including a drive assembly having a first drum with the cable disposed about a portion of the first drum.

Referring to FIGS. 2, 14A, 14B, 16-20, the left and right heating elements 96, 98 each include a first end 56 and a second end 58 spaced from each other. It is to be appreciated that the first and second ends 56, 58 of each of the left and right heating elements 96, 98 can be in any suitable location. A plurality of connectors 100 may be coupled to the left and right heating elements 96, 98 for allowing electrical current to flow therethrough. For example, FIGS. 2, 17, and 18 illustrate four connectors 100 with two connectors 100 coupled to the left heating element 96 and two connectors 100 coupled to the right heating element 98. More specifically, one of the connectors 100 is coupled to the first end 56 of the left heating element 96 and another one of the connectors 100 is coupled to the second end 58 of the left heating element 96. Likewise, yet another one of the connectors 100 is coupled to the first end 56 of the right heating element 98 and yet another one of the connectors 100 is coupled to the second end 58 of the right heating element 98.

As another example, FIGS. 14A, 14B, 16, 19, and 20, illustrate only two connectors 100, which will be discussed further below. The connectors 100 are in electrical communication with a power supply 103 of the vehicle 22, which is also as discussed further below. The connectors 100 are commonly referred to as pigtail connectors 100 as known to those skilled in the art. The connectors 100 can be coupled to the first and second ends 56, 58 of the left and right heating elements 96, 98 by soldering. It is to be appreciated that the connectors 100 can be coupled to the first and second ends 56, 58 of the left and right heating elements 96, 98 by welding, adhesive, or any other suitable method. It is to further be appreciated that the connectors 100 can be coupled to the left and right heating elements 96, 98 at any suitable location.

The embodiments above relate to electrical connections for the heating elements 96, 98 of the first and second fixed panels 90, 92. The heating elements 96, 98 of the first and second fixed panels 90, 92 may utilize separate and independent electrical connections because the fixed panels 90, 92 do not slide or move. To the contrary, as described herein, electrical connections to the center heating element 54 are provided by the cable 60 as the cable 60 moves the sliding window 28 and energizes the heating element 54.

Typically, the track 26 is coupled to the first and second fixed panels 90, 92 such that the sliding window 28 moves relative to the first and second fixed panels 90, 92 between the open position uncovering the opening 94 and the closed position covering the opening 94. In certain embodiments, the track 26 is further defined as a first track 26 and further includes a second guide track (hereinafter "second track") 102 spaced from the first track 26 with the second track 102 also coupled to the first and second fixed panels 90, 92. Typically, the second track 102 is spaced above the first track 26 with the sliding window 28 movably coupled to the first and second tracks 26, 102. In other words, the first and second tracks 26, 102 are disposed horizontally in a substantially spaced and parallel relationship such that the sliding window 28 moves horizontally back and forth relative to the first and second fixed panels 90, 92. The first and second tracks 26, 102 can be positioned in any other suitable orientation or location, such as, for example, vertically spaced such that the sliding window 28 moves vertically up and down relative to the first and second fixed panels 90, 92. The rail 34 as discussed above can be further defined as a first rail 34 coupled to the first track 26 and further including a second rail 104 coupled to the second track 102 for receiving and guiding the sliding window 28 (see FIGS. 14A, 14B, 16, 19, and 20). The second track 102 can be configured generally the same as the first track 26 and the second rail 104 can be configured generally the same as the first rail 34. It is to be appreciated that various mechanical and electrical components can be re-oriented or relocated to accommodate vertical tracks 26, 102 and vertical rails 34, 104 for vertical movement of the sliding window 28.

The first and second tracks 26, 102 are typically coupled to the first and second fixed panels 90, 92 by any suitable method, such as, for example, encapsulation, molding, bonding, etc. Generally, encapsulation results in an encapsulant that can be used to couple the first and second tracks 26, 102 to the first and second fixed panels 90, 92. As discussed above, encapsulation can be further defined as single-sided encapsulation, two-sided encapsulation, or three-sided encapsulation. For example, with single-sided encapsulation, the first and second tracks 26, 102 are coupled to the interior surface 46 of the first and second fixed panels 90, 92 leaving the exterior surface 50 of the first and second fixed panels 90, 92 free of the encapsulant. When encapsulation is employed, the first and second tracks 26, 102 are formed, at least partially, from the encapsulant. More specifically, with respect to encapsulation, the first and second tracks 26, 102 are formed of the encapsulant and are coupled to the first and second fixed panels 90, 92 by encapsulation. It is to be appreciated that any type of encapsulation or adhesive surface bonding can be utilized for coupling the first and second tracks 26, 102 to the first and second fixed panels 90, 92.

When utilizing encapsulation for the first and second tracks 26, 102, the encapsulant is typically formed of plastic materials) and more typically, thermoplastic material(s) or thermoset material(s). Even more typically, the plastic material is polyvinyl chloride (PVC). It is to be appreciated that the encapsulant can be formed from various plastic material(s), such as, for example, thermoplastic elastomers (TPE); elastomeric alloys, e.g. thermoplastic vulcanizates (TPV); thermoplastic polyolefins (TPO); thermoplastic styrene (TPS); polyurethane; and various different types of reaction injection molding (RIM) materials, or any other suitable material(s) for encapsulation. One example of a suitable polyurethane is commercially available from BASF Corporation under the trade name of COLO-FAST™, e.g. COLO-FAST™ LM-161. However, it is to be appreciated that any other suitable material(s) can be utilized for forming the first and second tracks 26, 102.

Referring to FIGS. 14A, 14B, 16, 19, and 20, in certain embodiments, the rail 34 can be further defined as a conductive rail 34 in electrical connection to at least one of the left and right heating elements 96, 98. In other words, the conductive rail 34 is in electrical connection to the left heating element 96 of the first fixed panel 90 or the right heating element 98 of the second fixed panel 92. In one alternative, the conductive rail 34 is in electrical connection to both the left and right heating elements 96, 98 of the first and second fixed panels 90, 92, respectively. Hence, the left and right heating elements 96, 98 of the first and second fixed panels 90, 92, respectively are energized through the conductive rail 34 with the heating element 54 of the sliding window 28 energized through the cable 60, and more specifically, the first and second terminal ends 72, 74. Additional discussion of the alternatives/embodiments of the conductive rail 34 and the first and second ends 72, 74 is provided below.

In one embodiment, the conductive rail 34 can be further defined as a first conductive rail 34 coupled to the first track 26 and the sliding window assembly 10 may further include a second conductive rail 104 coupled to the second track 102 such that the first and second conductive rails 34, 104 are in electrical connection to at least one of the left and right heating elements 96, 98. In one alternative, the first and second conductive rails 34, 104 are in electrical connection to both the left and right heating elements 96, 98 of the first and second fixed panels 90, 92, respectively. Hence, the left and right heating elements 96, 98 of the first and second fixed panels 90, 92, respectively are energized through the first and second conductive rails 34, 104. The left heating element 96 of the first fixed panel 90 can be energized by the conductive rail 34 while separately the right heating element 98 of the second fixed panel 90 can be energized by another conductive rail 34. For example, the left heating element 96 of the first fixed panel 90 can be energized by the first and second conductive rails 34, 104 while separately the right heating element 98 of the second fixed panel 92 can be energized by other first and second conductive rails 34, 104.

Referring to FIGS. 14A, 14B, 15, and 16, a plurality of first lower connectors 105 are each coupled to the first conductive rail 34 and a plurality of first upper connectors 107 are each coupled to the second conductive rail 104 for electrically connecting the first and second conductive rails 34, 104 to the left and right heating elements 96, 98. Typically, the first lower connectors 105 are each coupled the first conductive rail 34 and respective left and right heating elements 96, 98. Similarly, the first upper connectors 107 are each coupled to the second conductive rail 104 and respective left and right heating elements 96, 98. More specifically, each of the first lower connectors 105 are coupled to the first conductive rail 70 and respective left and right heating elements 96, 98 with each of the first upper connectors 107 coupled to the second conductive rail 104 and respective left and right heating elements 96, 98. The first lower and upper connectors 105, 107 are coupled to respective first and second ends 56, 58 of the left and right heating elements 96, 98. It is to be appreciated that the first and second ends 56, 58 of the left and right heating elements 96, 98 can be at any suitable location. The first lower and upper connectors 105, 107 can be coupled to the left and right heating elements 96, 98, as well as the first and second conductive rails 34, 104, at any suitable location. The first lower and upper connectors 105, 107 can be coupled to the first and second conductive rails 34, 104 by soldering or by any other suitable method. See U.S. patent application Ser. No. 12/944,448 for a further discussion of the first lower and upper connectors 105, 107 and the methods of coupling the first lower and upper connectors 105, 107 to the first and second conductive rails 34, 104.

Electrical current flows through the left or right heating elements 96, 98 of the first and second fixed panels 90, 92 and the heating element 54 of the sliding window 28 by any suitable method. For alternatives/embodiments described herein, the first and second terminal ends 72, 74 energize the heating element 54 of the sliding window 28.

In one alternative, the first and second terminal ends 72, 74 energize the heating element 54 of the sliding window 28 and the first and second conductive rails 34, 104 energize one of the left and right heating elements 96, 98 of one of the first and second fixed panels 90, 92 respectively. In this alternative, additional first and second terminal ends 72, 74 energize the left or right heating element 96, 98. In another alternative, the first and second conductive terminal ends 72, 74 energize the heating element 54 of the sliding window 28 and the first and second conductive rails 34, 104 energize both of the left and right heating elements 96, 98 of the first and second fixed panels 90, 92. Hence, the left and right heating elements 96, 98 of the first and second fixed panels 90, 92, respectively are energized through the first and second conductive rails 34, 104 with the heating element 54 of the sliding window 28 energized through the first and second terminal ends 72, 74. It is to be appreciated that the heating element 54 of the sliding window 28, as well as the left and right heating elements 96, 98 of the first and second fixed panels 90, 92, can each be energized by separate first and second terminal ends 72, 74.

The power supply 103 of the vehicle 22 is electrically coupled to at least one of the left and right heating elements 96, 98 for transferring electrical current through the left and right heating elements 96, 98. Typically, the power supply 103 is electrically coupled to both the left and right heating elements 96, 98 for transferring electrical current through the left and right heating elements 96, 98. More specifically, the power supply 103 is electrically coupled to the connectors 100 of the left and right heating elements 96, 98 for transferring electrical current through the left and right heating elements 96, 98. The power supply 103 can include a plurality of connections, and for example, can include a first connection electrically coupled to the connector 100 coupled to the first end 56 of the left heating element 96 and a second connection electrically coupled to the connector 100 coupled to the second end 58 of the left heating element 96. Likewise, another first connection is electrically coupled to the connector 100 coupled to the first end 56 of the right heating element 98 and another second connection is electrically coupled to the connector 100 of the second end 58 of the right heating element 98. In other words, the left and right heating elements 96, 98 are electrically coupled to the power supply 103 independently of each other. As such, if the electrical connection is broken in the left heating element 96, the right heating element 98 will continue to operate, and vice versa. It is to be appreciated that any suitable switches, relays, etc. can be utilized to transfer the electrical current from the power supply 103 to the first and second conductive rails 34, 104 or any other desired electrical/mechanical component(s) of the vehicle 22.

FIGS. 2, 17, and 18 illustrate configurations in which there are four connectors 100. Here, two connectors 100 are coupled to power supply 103 positive (+) while two connectors 100 are coupled to power supply 103 ground (−). FIGS. 14A, 14B, 16, 19 and 20 illustrate configurations in which there are two connectors 100. Here, one of the connectors 100 is coupled to power supply 103 positive (+) while the other one of the connectors 100 is coupled to power supply 103 ground (−).

In certain embodiments, the power supply 103 is electrically coupled to the conductive rail 34 for transferring electrical current through the conductive rail 34 and the left or right heating elements 96, 98. More specifically, the power supply 103 is electrically coupled to the first or second conductive rails 34, 104 and even more specifically, the power supply 103 positive (+) is electrically coupled to the first conductive rail 34 and the power supply 103 ground (−) is electrically coupled to the second conductive rail 104. For example, referring to FIGS. 14B and 16, one of the connectors 100 is coupled to the first conductive rail 34 and another one of the connectors 100 is coupled to the second conductive rail 104 for allowing electrical current to flow therethrough. In other words, one of the connectors 100 is coupled to respective first and second conductive rails 34, 104 such that the left and right heating elements 96, 98 are in continuous electrical connection to the first and second conductive rails 34, 104 in a parallel circuit. As such, the left and right heating elements 96, 98 are electrically coupled to the first and second conductive rails 34, 104 and the center heating element 54 of the sliding window 28 is electrically coupled to the cable 60 independently of the first and second conductive rails 34, 104.

Figure 14A:
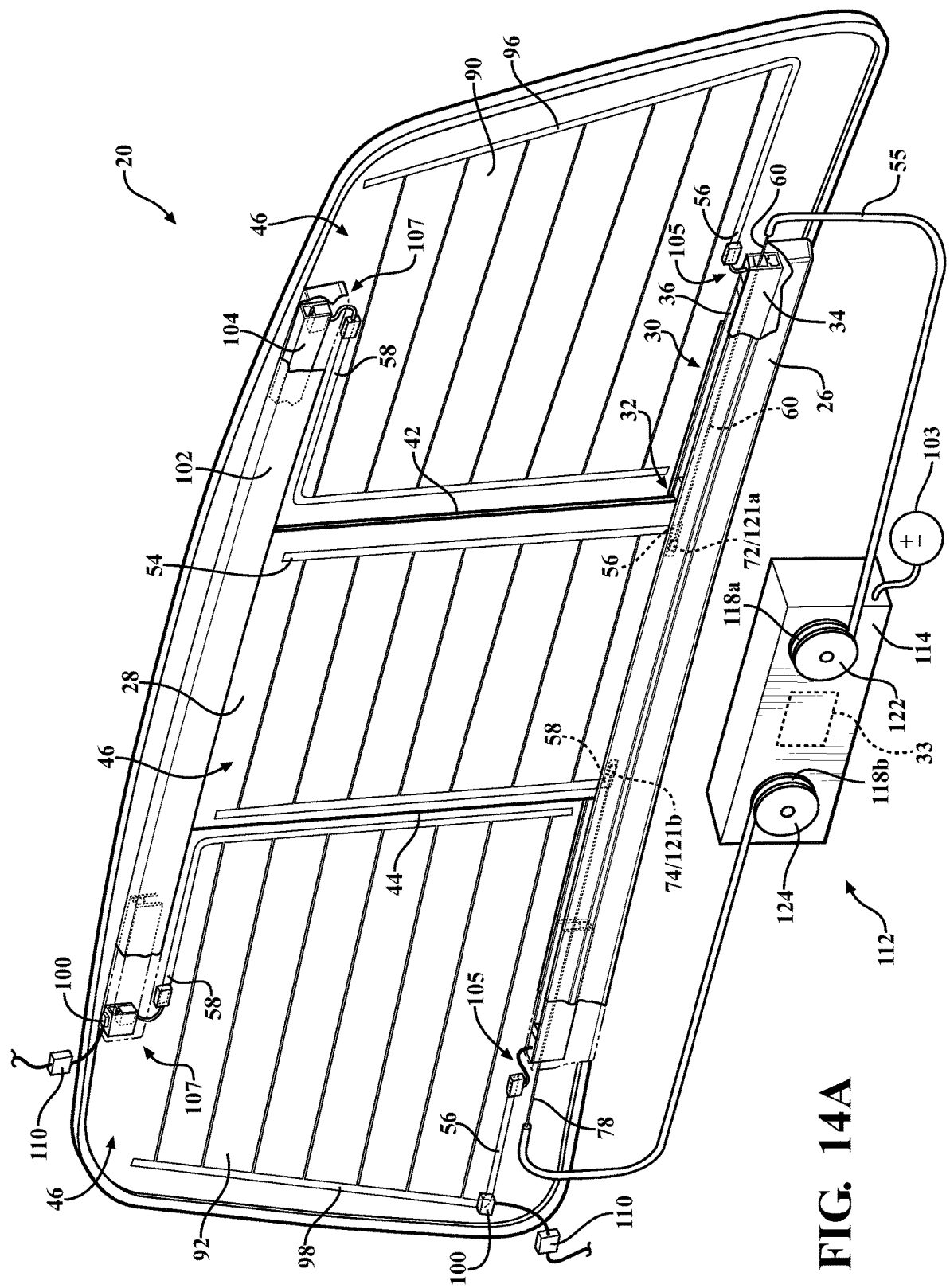
FIG. 14A is a perspective view of an interior of another sliding window assembly having a first fixed panel, a second fixed panel, and a sliding window disposed therebetween in a closed position with a first conductive rail and a second conductive rail and a cable drive system including a drive assembly having a first drum and a second drum with one connector coupled to the second conductive rail and another connector coupled to the first end of the right heating element.

As another example, referring to FIG. 14A, one of the connectors 100 is coupled to one of the first and second conductive rails 34, 104 and another one of the connectors 100 is coupled to one of the left and right heating elements 96, 98 such that the left and right heating elements 96, 98 are in continuous electrical connection to the first and second conductive rails 34, 104 in the parallel circuit. Specifically, one of the connectors 100 is coupled to one of the first and second conductive rails 34, 104 and another one of the connectors 100 is coupled to one of the first and second ends 56, 58 of one of the left and right heating elements 96, 98. More specifically, FIG. 14A illustrates one of the connectors 100 coupled to the second conductive rail 104 and another one of the connectors 100 coupled to the first end 56 of the right heating element 98. Typically, the power supply 103 provides continuous flow of electrical current through the left and right heating elements 96, 98 of the first and second fixed panels 90, 92 respectively. As such, if the electrical connection is broken in the left heating element 96, the right heating element 98 will continue to operate, and vice versa.

In one embodiment, as shown in FIG. 16, the heating element 54 of the sliding window 28 can also be electrically coupled to the conductive rail 34, and more specifically the first and second conductive rails 34, 104. Typically, a second upper connector 106 and a second lower connector 108 are each coupled to the heating element 54 of the sliding window 28 and continuously engage the first and second conductive rails 34 respectively during movement of the sliding window 28 such that the heating element 54 of the sliding window 28 remains electrically coupled to the first and second conductive rails 34. The second lower connector 108 is coupled to one of the first and second ends 56, 58 of the heating element 54 and the second upper connector 106 is coupled to a third end 111 of the sliding window. It is to be appreciated that the first, second, and third ends 56, 58, 111 of the heating element 54 of the sliding window 28 can be at any suitable location. It is to further be appreciated that the second upper and lower connectors 106, 108 can be coupled to the heating element 54 of the sliding window 28 at any suitable location. Typically, the second upper and lower connectors 106, 108 are coupled to the heating element 54 of the sliding window 28 by soldering. It is to be appreciated that the second upper and lower connectors 106, 108 can be coupled to the first, second, or third ends 56, 58, 111 of the heating element 54 of the sliding window 28 by welding, adhesive, or any other suitable method. It is to also be appreciated that the second upper and lower connectors 106, 108 can be coupled to the first and second conductive rails 34, 104 respectively such that the sliding window 28 moves back and forth relative to the connectors 106, 108 and is further disclosed in U.S. patent application Ser. No. 12/944,448, It is to further be appreciated that the first and second conductive rails 34, 104 as disclosed in U.S. patent application Ser. No. 12/944,448 and the cable 60 coupled with the terminal ends 72, 74 as disclosed herein, can be utilized together as shown in FIG. 16 thereby providing a back-up mechanism for the heating element 54 of the sliding window 28.

Referring to FIGS. 2, 14A, 14B, 16-20, a wire harness 110 may be utilized to electrically connect the left and right heating elements 96, 98 of the first and second fixed panels 90, 92 to the power supply 103. Further, the wire harness 110 may be utilized to electrically connect the first and second conductive rails 34, 104 to the power supply 103. In one example, as shown in FIGS. 2, 17, and 18, the wire harness 110 is coupled to the connectors 100 coupled to one of the left and right heating elements 96, 98. More specifically, FIGS. 2, 17, and 18 illustrate one wire harness 110 coupled to the connectors 100 coupled to the left heating element 96 and another wire harness 110 coupled to the connectors 100 coupled to the right heating element 98. As such, the center, left, and right heating elements 54, 96, 98 are electrically coupled to the power supply 103 independently of each other. In other words, electrical current flows through the left heating element 96 through the connectors 100 and one wire harness 110 and electrical current flows through the right heating element 98 through other connectors 100 and another wire harness 110 and additionally, electrical current flows through the center heating element 54 utilizing the cable 60 electrically coupled to a drive assembly 114 as discussed further below.

Figure 14B:
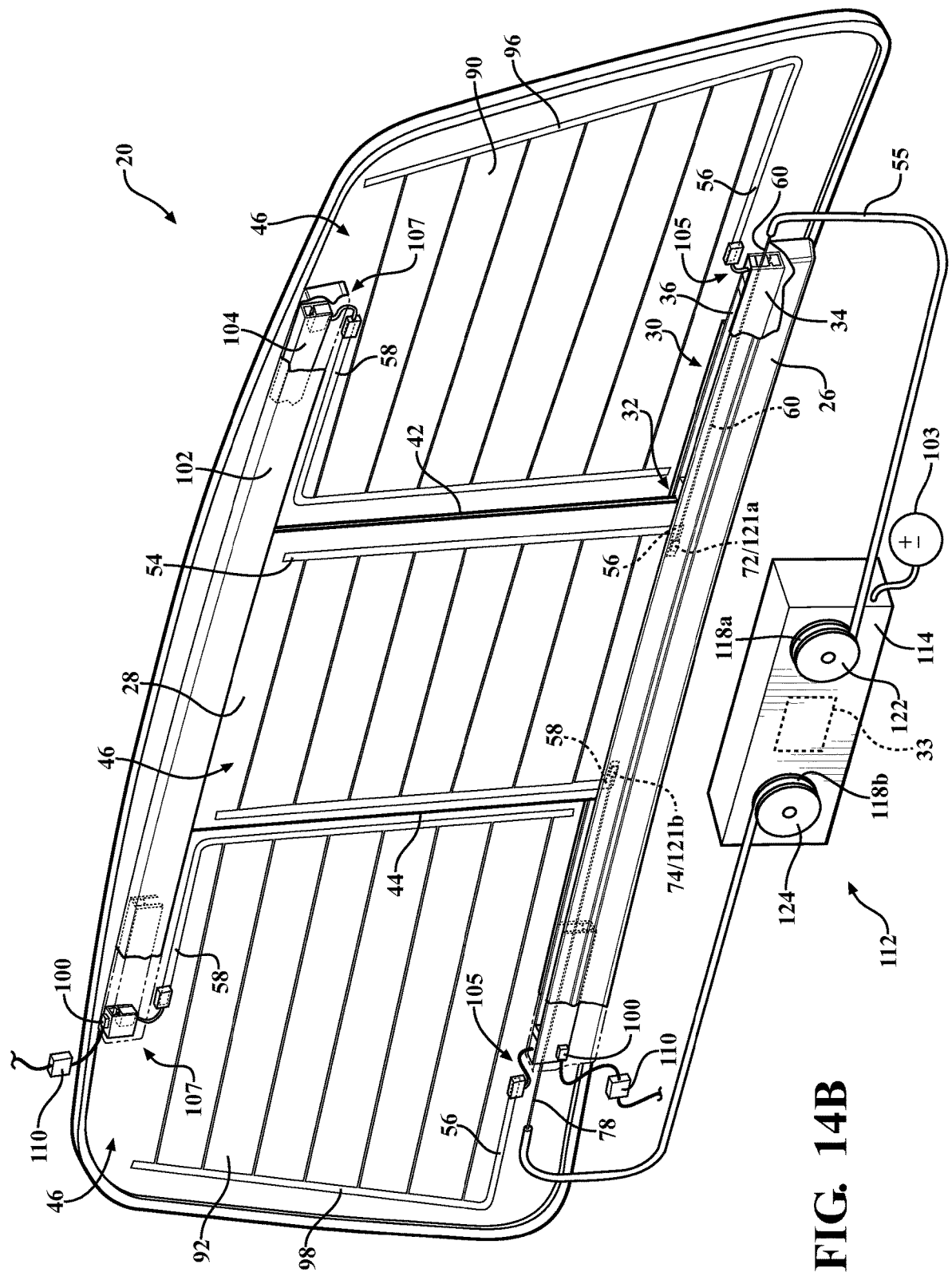
FIG. 14B is a perspective view of the interior of the sliding window assembly with the first and second conductive rails and the cable drive system having the first and second drums with one connector coupled to the first conductive rail and another connector coupled to the second conductive rail.
Figure 15:
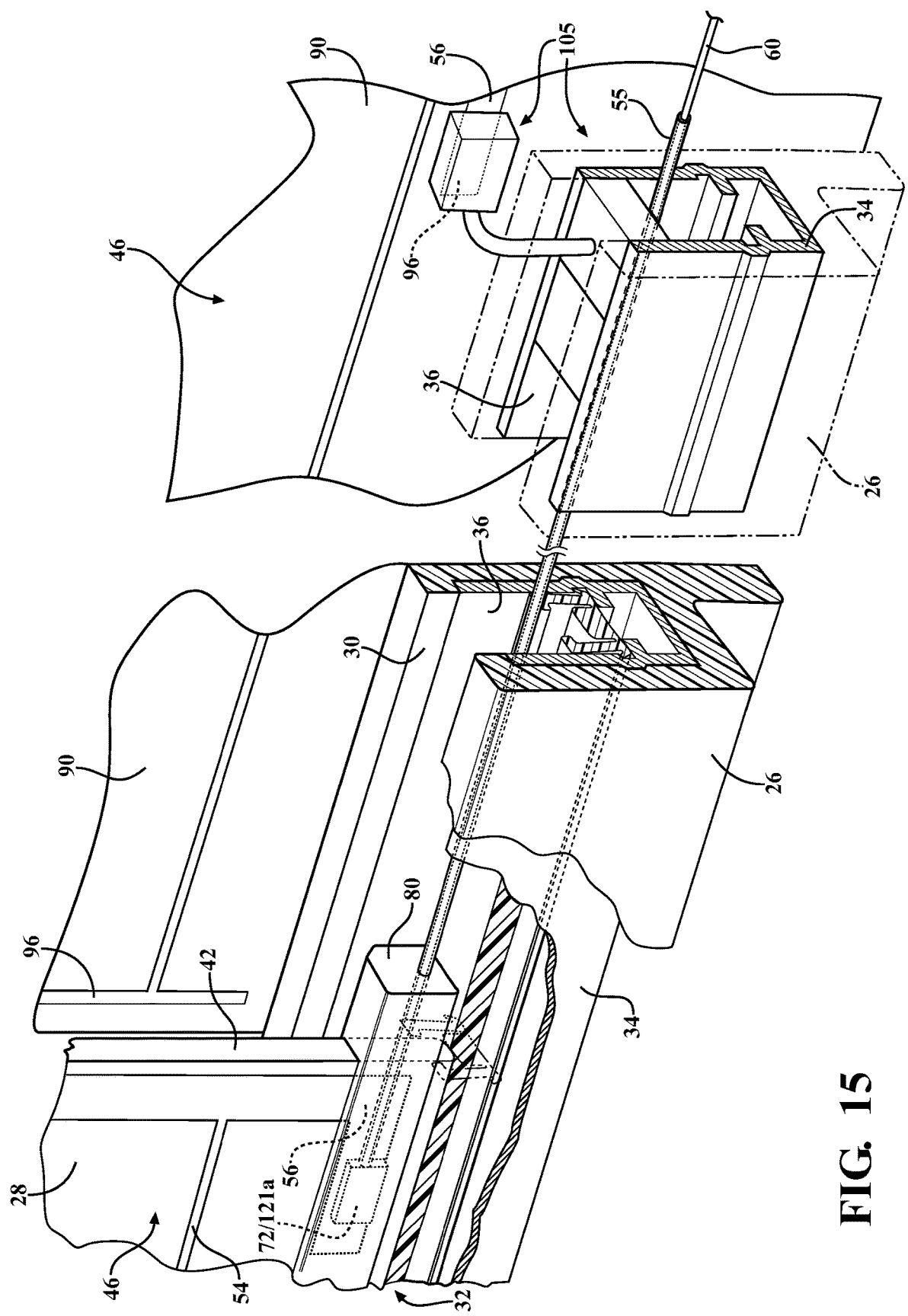
FIG. 15 is a perspective broken view of the cable coupled to the sliding window with connectors coupled to the first conductive rail and the first fixed panel.

In another example, as shown in FIGS. 14B and 16, the wire harness 110 is coupled to the connectors 100 coupled to the first and second conductive rails 34, 104. In FIG. 14B, electrical current flows through the left, and right heating elements 96, 98 utilizing the first and second conductive rails 34, 104. Therefore, the left and right heating elements 96, 98 are in continuous electrical connection to the first and second conductive rails 34, 104 in the parallel circuit such that electrical current flows through the left and right heating elements 96, 98 independently of each other and independent of the left and right heating elements 96, 98, electrical current flows through the center heating element 54 utilizing the cable 60 electrically coupled to the drive assembly 114. As mentioned above, FIG. 16 illustrates the back-up mechanism for the center heating element 54, therefore, the center, left, and right heating elements 54, 96, 98 are in continuous electrical connection to the first and second conductive rails 34, 104 in the parallel circuit such that electrical current flows through the center, left, and right heating elements 54, 96, 98 independently of each other and additionally, electrical current flows through the center heating element 54 utilizing the cable 60 electrically coupled to the drive assembly 114.

In yet another example, as shown in FIG. 14A, the wire harness 110 is coupled to the connector 100 coupled to one of the left and right heating elements 96, 98 and the connector 100 coupled to one of the first and second conductive rails 34, 104. More specifically, FIG. 14A illustrates the wire harness 110 coupled to the connector 100 coupled to the right heating element 98 and the connector 100 coupled to the second conductive rail 104. As such, electrical current flows through the right heating element 98 and the left heating element 96 utilizing the first and second conductive rails 34, 104 and independent of the first and second conductive rails 34, 104, electrical current flows through the center heating element 54 utilizing the cable 60 electrically coupled to the drive assembly 114. In other words, electrical current flows through the right heating element 98, through one of the first and second conductive rails 34, 104, through the left heating element 96, through the other one of the first and second conductive rails 34, 104 and out to the power supply 103 and independently, electrical current flows through the center heating element 54 utilizing the cable 60 electrically coupled to the drive assembly 114. It is to be appreciated for FIG. 14A, one of the connectors 100 can be coupled to the left heating element 96 instead of the right heating element 98.

It is to be appreciated that the wire harness 110 can be coupled to the connectors 100 in any suitable location. It is to further be appreciated that any suitable mechanism can be utilized to transfer electrical current through the first and second conductive rails 34, 104 and the left and right heating elements 96, 98. It is to also be appreciated that electrical current can flow through the entire first and second conductive rails 34, 104 or electrical current can flow through a portion of the first and second conductive rails 34, 104.

Figure 19:
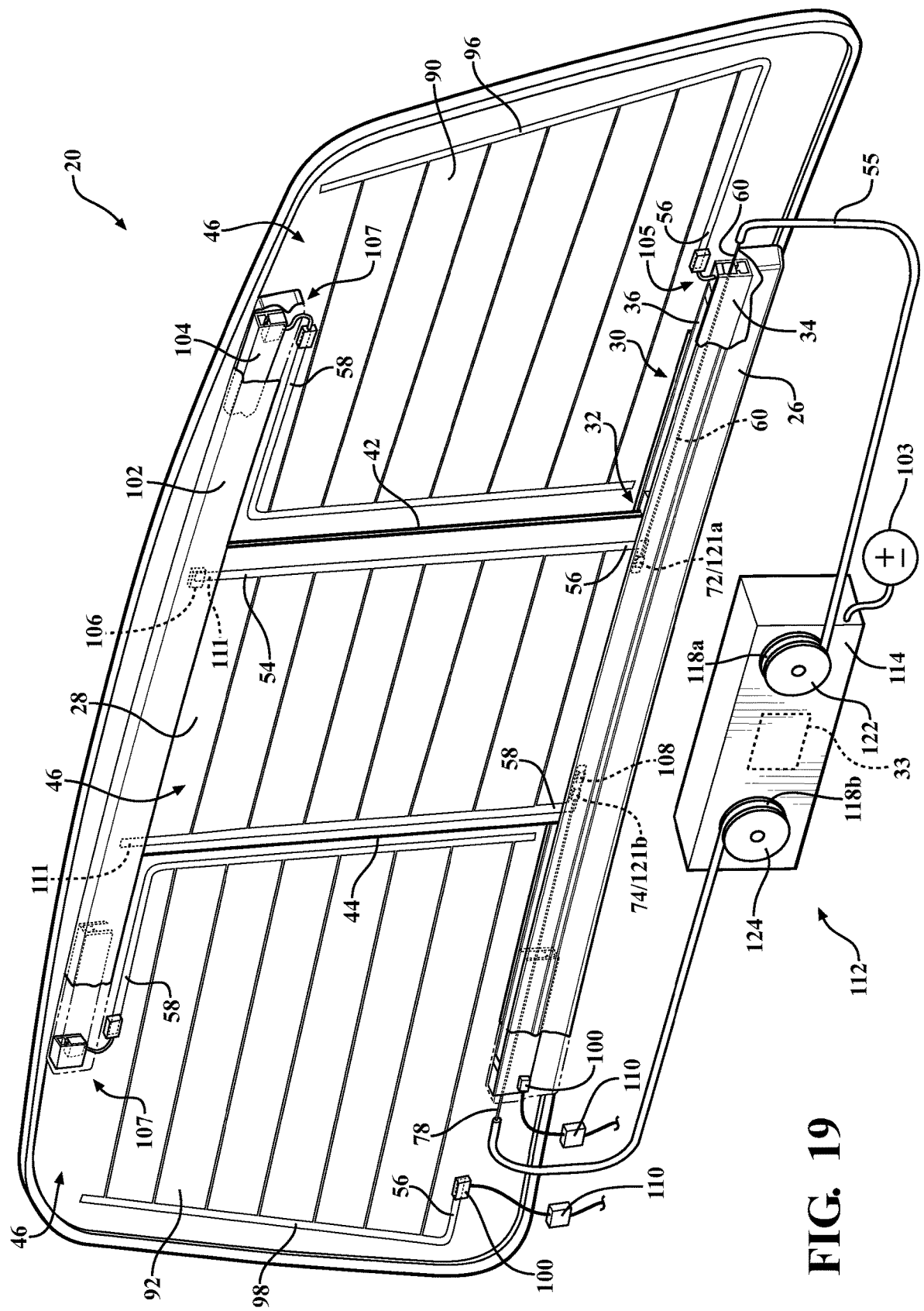
FIG. 19 is a perspective view of an interior of another sliding window assembly and a cable drive system with a left heating element and a right heating element electrically connected in a series circuit.
Figure 20:
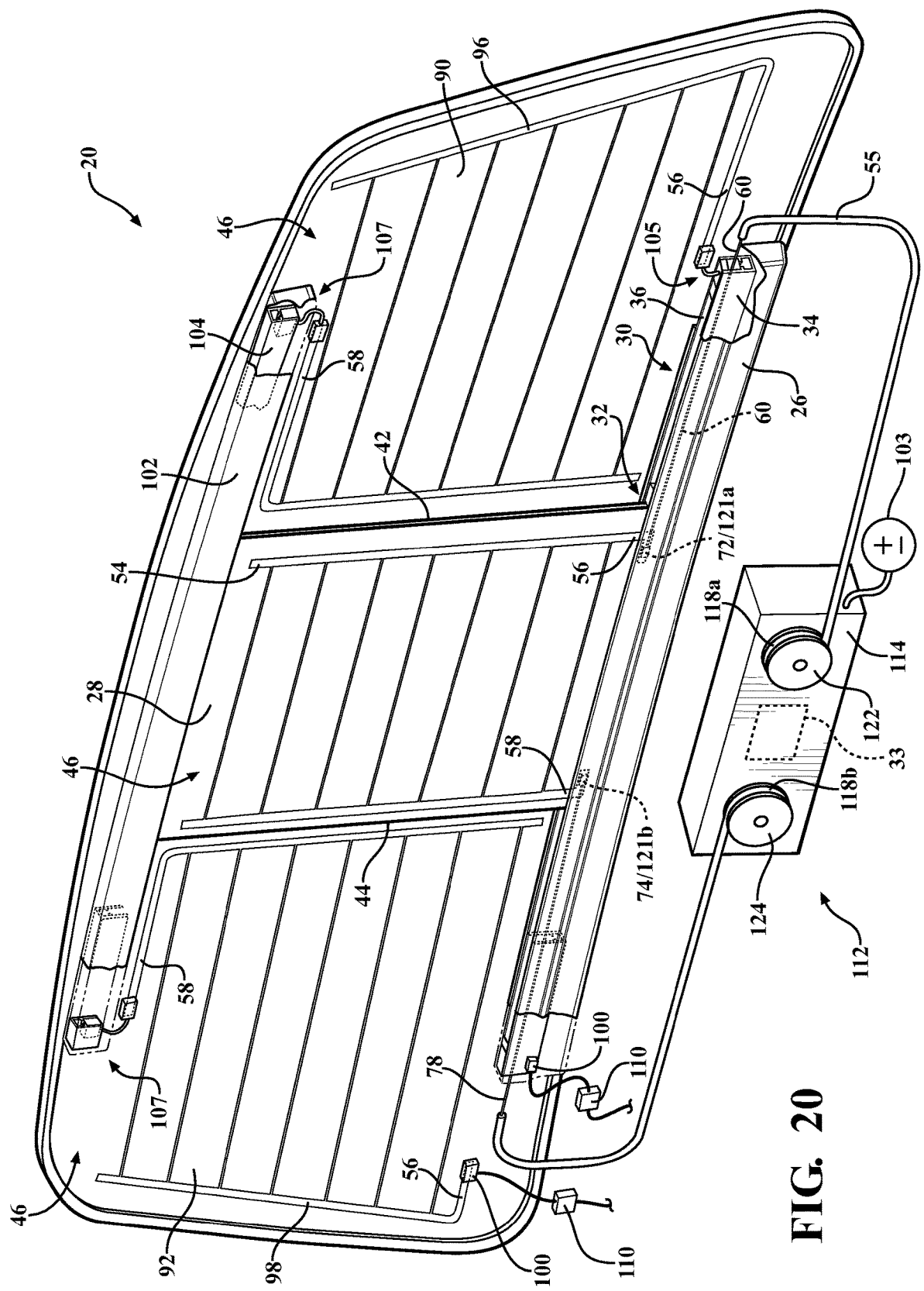
FIG. 20 is a perspective view of an interior of yet another sliding window assembly and the cable drive system with the left and right heating elements electrically connected in a series circuit.
Figure 21:
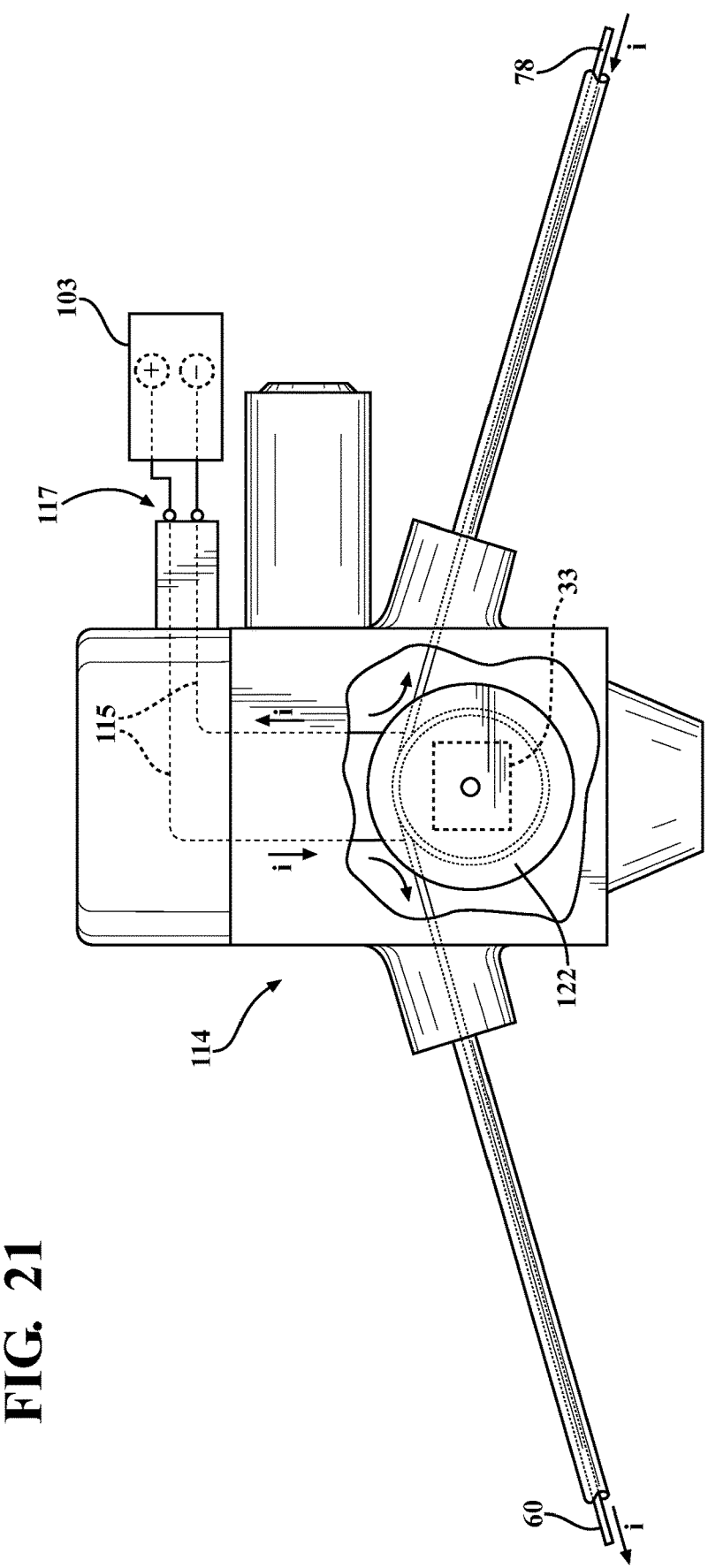
FIG. 21 is a side view, partially in phantom, of the drive assembly mechanically and electrically coupled to first and second cables according to one embodiment.

In certain embodiments, as shown in FIGS. 19 and 20, the left and right heating elements 96, 98 are in continuous electrical connection to the conductive rail 34 in a series circuit. More specifically, the left and right heating elements 96, 98 are in continuous electrical connection to the first and second conductive rails 34, 104 in the series circuit. As such, electrical current flows through one of the left and right heating elements 96, 98, through one of the first and second conductive rails 34, 104, through the other one of the left and right heating elements 96, 98, through the other one of the first and second conductive rails 34, 104 and out to the power supply 103.

FIGS. 19 and 20 illustrate one of the connectors 100 coupled to one of the first and second conductive rails 34, 104 and another one of the connectors 100 coupled to one of the left and right heating elements 96, 98 such that the left and right heating elements 96, 98 are in continuous electrical connection in the series circuit. More specifically, FIGS. 19 and 20 illustrate one connector 100 coupled to the first end 56 of the right heating element 98 and another connector 100 coupled to the first conductive rail 34. For the embodiment of FIGS. 19 and 20, one of the first lower and upper connectors 105, 107 can be eliminated. For example, one of the first lower connectors 105 has been eliminated such that electrical current flows through the left and right heating elements 96, 98 in the series circuit.

Further, FIG. 19 illustrates utilizing the second upper and lower connectors 106, 108 electrically coupled to the first and second conductive rails 34, 104. Hence, the center heating element 54 is in the parallel circuit with the left heating element 96 and the center heating element 54 is in the series circuit with the right heating element 98. In addition, FIG. 19 illustrates the back-up mechanism of energizing the center heating element 54 in two different ways. As such, electrical current can also flow through the center heating element 54 independently of the left and right heating elements 96, 98 utilizing the cable 60 electrically coupled to the drive assembly 114. It is to be appreciated that for any of these embodiments/alternatives, the back-up mechanism is optional. Additionally, FIG. 20 illustrates that electrical current can also flow through the center heating element 54 independently of the left and right heating elements 96, 98 utilizing the cable 60 electrically coupled to the drive assembly 114 without utilizing the back-up mechanism.

Referring to FIGS. 2, 14A, 14B, 16-24, a cable drive system 112 for the sliding window 28 having the heating element 54 is generally shown. The cable drive system 112 includes the cable 60 mechanically moving the sliding window 28 and for electrically connecting to the heating element 54 via the first and second terminals 72, 74, as discussed above. The cable 60 is movable between a first position and a second position corresponding to the movement of the sliding window 28. In other words, when the cable 60 moves to the first position, the sliding window 28 moves to the open position and when the cable 60 moves to the second position, the sliding window 28 moves to the closed position.

The cable drive system 112 includes the drive assembly 114 electrically coupled to the power supply 103 of the vehicle 22. The power supply 103 also provides electrical current to the drive assembly 114 for allowing the drive assembly 114 to move the sliding window 28 while also providing electrical current to the cable 60. The cable 60 is mechanically and electrically coupled to the drive assembly 114. The power supply 103 provides electrical current to the cable 60 through the drive assembly 114. The power supply 103 also provides electrical current to the left and right heating elements 96, 98 and the first and second conductive rails 34, 104. As mentioned above, it is to be appreciated that any suitable switches, relays, etc. can be utilized to transfer the electrical current from the power supply 103 to the drive assembly 114 and first and second conductive rails 34, 104 or any other desired electrical/mechanical component(s) of the vehicle 22. It is to be appreciated that a plurality of power supplies can be utilized to provide electrical current to any desired electrical/mechanical component(s) of the vehicle 22. Further details about the electrical connection between the power supply 103, drive assembly 114, and the cable(s), 60, 78 are provided below.

The first and second terminal ends 72, 74 are movable concurrently with the cable 60 between the first and second positions. As discussed above, the first terminal end 72 is coupled to the first end 56 of the heating element 54 and the second terminal end 74 is coupled to the second end 58 of the heating element 54 for electrically connecting the heating element 54 to the cable 60. Hence, the heating element 54 of the sliding window 28 remains electrically coupled to the cable 60 in both the open and closed positions.

As shown in FIGS. 2, 14A, 14B, 16, 19, 20, and 24, in one alternative, the drive assembly 114 includes a first drum 122 and a second drum spaced from each other and each movable independent of each other. The drum 122 is configured to rotate. In other embodiments, the drive assembly 114 may include only the first drum 122. The first drum 122 may be utilized with the first cable 60, second cable 78, or both the first and second cables 60, 78 in combination.

One non-limiting example of the drive assembly 114 is a motor assembly. In such instances, the drums 122, 124 may be driven by at least one motor 33. The motor 33 is preferably an electric motor, and more specifically, a DC motor. The motor 33 may comprise a reversible electric motor that is operably connected to the drum(s) 122, 124 by gears or other suitable drive mechanism (not shown). One single motor 33 may drive more than one of the drums 122, 124. Alternatively, each drum 122, 124 may be driven by a separate motor. Those skilled in the art appreciate that other suitable means besides a DC motor may be utilized to implement rotation of the drum 122.

The first and second drums 122, 124 move the first and second cables 60, 78 between the first and second positions thereby moving the sliding window 28 between the open and closed position. In one embodiment, the first end 118a of the first cable 60 is coupled to the first drum 122 and the first end 118b of the second cable 78 is coupled to the second drum 124.

The first and second drums 122, 124 are electrically isolated from one another because the first and second drums 122, 124 are spaced from one another. Electrical current flows through the first and second drums 122, 124 to energize the heating element 54 of the sliding window 28. Hence, electrical current flows through the first and second drums 122, 124, the first and second terminal ends 72, 74 and the heating element 54 of the sliding window 28.

In one embodiment, the power supply 103 positive (+) is electrically coupled to the first drum 122 and the power supply 103 ground (−) is electrically coupled to the second drum 124. In such instances, electrical current passes from the power supply 103 positive (+) to the first drum 122 to the first cable 60 to the first terminal 72 to the heating element 54. After passing through the heating element 54, electrical current passes to the second terminal 74 to the second cable 78 to the second drum 124 and back to power supply 103 ground (−). Of course, the power supply 103 ground (−) may be electrically coupled to the first drum 122 and the power supply 103 positive (+) may be electrically coupled to the second drum 124. In such instances, the path of electrical current is opposite as described above.

In one embodiment, as shown in FIGS. 21-24, electrical wires 115 are coupled between the power supply 103 and the drive assembly 114. The electrical wires 115 may be part of a wiring harness or may stand-alone. In FIGS. 21-24, the drive assembly 114 may include a first contact 117 and a second contact 119 spaced from the first contact 117. The first and second contacts 117, 119 electrically connect the drum 122 to the power supply 103 such electrical current from the power supply 103 is transferred to the drum 122. As such, the first and second contacts 117, 119 may be part of the electrical path when the heating element 54 is energized.

To move the sliding window 28 to the open position, the first drum 122 rotates in a first direction, which unwinds the first cable 60 on the first drum 122 while the second drum 124 rotates in a second direction opposite the first direction, which winds up the second cable 78 on the second drum 124. As such, the second cable 78 pulls the sliding window 28 to the open position. Likewise, to move the sliding window 28 to the closed position, the first drum 122 rotates in the second direction, which winds up the first cable 60 on the first drum 122 and the second drum 124 rotates in the first direction, which unwinds the second cable 78 on the second drum 124. Thus, the first cable 60 pulls the sliding window 28 to the closed position. The heating element 54 of the sliding window 28 remains electrically coupled to the first and second terminal ends 72, 74 during rotation of the first and second drums 122, 124 when the sliding window 28 moves between the open and closed positions. Typically, the first direction is counter-clockwise and the second direction is clockwise. It is to be appreciated that the first direction can be clockwise and the second direction can be counter-clockwise.

The first and second cables 60, 78 can be wrapped around the first and second drums 122, 124, respective in any suitable manner for moving the sliding window 28 between the open and closed positions. It is to also be appreciated that the first and second drums 122, 124 can rotate in the same direction to wind or unwind the first and second cables 60, 78. Hence, when the first and second drums 122, 124 rotate in the same direction, the manner in which at least one of the first and second cables 60, 78 are wrapped around at least one of the first and second drums 122, 124 changes. The drive assembly 114 configuration discussed above is commonly referred to as a pull-pull cable system as known to those skilled in the art. It is to be appreciated that any suitable drive assembly 114 can be utilized to move the sliding window 28 between the open and closed positions.

In another alternative, as shown in FIGS. 17, 22, and 23 the drive assembly 114 includes only the first drum 122. In other words, the second drum 124 is eliminated. In this configuration, the first and second cables 60, 78 are coupled to the first drum 122. Likewise, the first and second terminal ends 72, 74 are coupled to the first drum 122 by way of the first and second cables 60, 78, respectively. Typically, in this configuration, the first and second cables 60, 78 are wrapped around the first drum 122 in opposite directions. For example, if the first direction is clockwise, rotation of the first drum 122 in the first direction moves the sliding window 28 to the open position and if the second direction is counter-clockwise, rotation of the first drum 122 in the second direction moves the sliding window 28 to the closed position.

In this configuration, the first drum 122 comprises a first portion 138 and a second portion 140 being electrically isolated from the first portion 138 with an electrical isolator 141. The first cable 60 is electrically and mechanically coupled to the first portion 138 and the second cable 78 is electrically and mechanically coupled to the second portion 140. The first cable 60 may be electrically coupled to the first portion 138 through the first contact 117. The second cable 78 may be electrically coupled to the second portion 140 through the second contact 119. The first and second portions 138, 140 may be electrically isolated using any suitable insulation means, such as a dielectric plate disposed therebetween.

The heating element 54 of the sliding window 28 remains electrically coupled to the first and second terminal ends 72, 74 during rotation of the first drum 122 when the sliding window 28 moves between the open and closed positions. In other words, the heating element 54 of the sliding window 28 remains electrically coupled to the first and second terminal ends 72, 74 during movement of the sliding window 28 between the open and closed positions. The first and second cables 60, 78 can be wrapped around the first drum 122 in any suitable manner for moving the sliding window 28 between the open and closed positions.

Typically, the drive assembly 114 is the pull-pull cable system as discussed above. As such, to move the sliding window 28 to the open position when the first direction is clockwise, the first drum 122 rotates in the first direction, which unwinds the first cable 60 on the first drum 122 while the second cable 78 winds up on the first drum 122. Simply stated, the second cable 78 pulls the sliding window 28 to the open position. Likewise, to move the sliding window 28 to the closed position and the second direction is counter-clockwise, the first drum 122 rotates in the second direction which winds up the first cable 60 on the first drum 122 while the second cable 78 unwinds on the first drum 122. Simply stated, the first cable 60 pulls the sliding window 28 to the closed position. It is to be appreciated that the first direction can be counter-clockwise and the second direction can be clockwise. The above-described configuration is possible in the embodiment wherein the first drum 122 includes the first and second portions 138, 140.

In yet another alternative, as shown in FIG. 18, the drive assembly 114 again includes only the first drum 122 with the cable 60 coupled to the first drum 122. In other words, the second drum 124 is eliminated. In this configuration, the cable 60 appears to be one piece. The cable 60 is only wrapped around a portion of the first drum 122 such that the cable 60 is coupled to the first drum 122 by a friction fit. Further, the cable 60 is under tension for this configuration.

As such, rotation of the first drum 122 causes the cable 60 to move back and forth along a portion of the first drum 122 instead of completely wrapping around the first drum 122. Despite moving back and forth along the portion of the first drum 112, the cable 60 remains electrically coupled to the first drum 122 and the power supply 103.

It is to be appreciated for any of the embodiments/alternatives discussed above, guides can be used for positioning and guiding the first and second cables 60, 78 and the first and second terminal ends 72, 74 between the drive assembly 114 and the sliding window 28. For illustrative purposes only, some of the details of at least FIGS. 2, 14A, 14B, 15-24 are not shown for illustrating other components of the subject invention.

Figure 25:
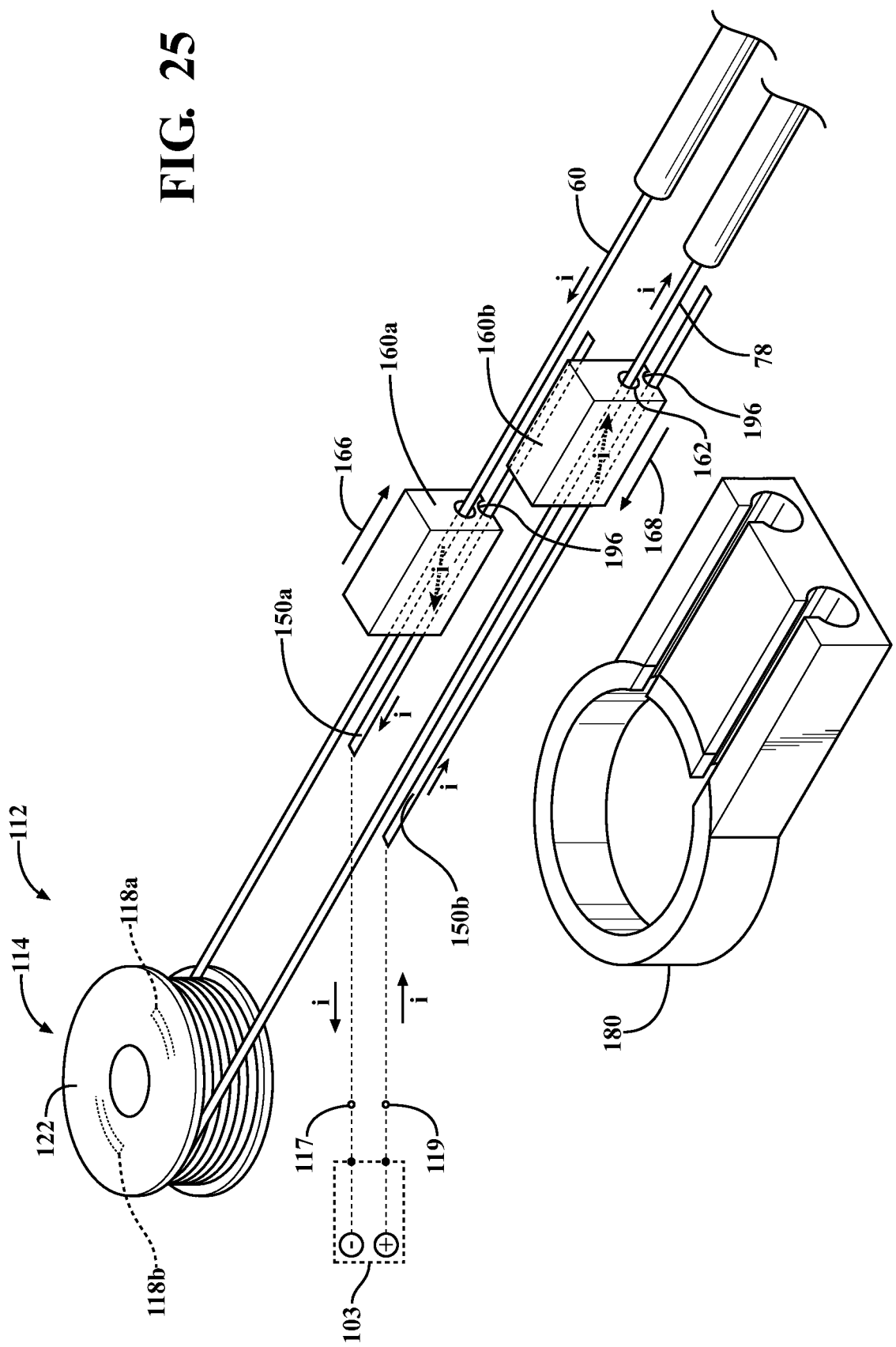
FIG. 25 is an exploded isometric view of a portion of the drive assembly illustrating interaction between a conductive element coupled to the cable and a conductive terminal coupled to a power supply of the vehicle according to one embodiment.
Figure 26:
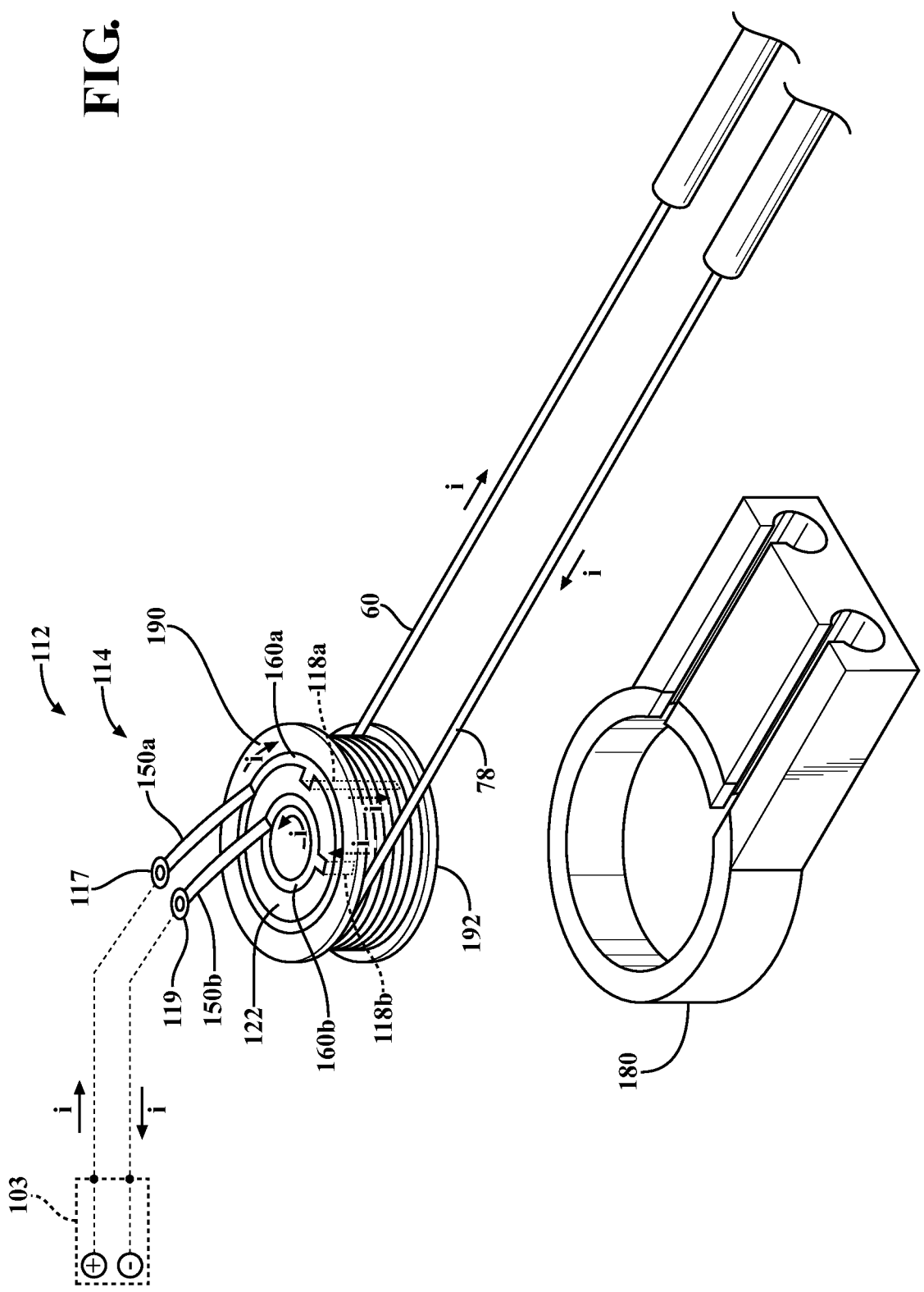
FIG. 26 is an exploded isometric view of a portion of the drive assembly illustrating interaction between a conductive element coupled to the drum and a conductive terminal coupled to the power supply of the vehicle according to another embodiment.

Embodiments and further details of the drive assembly 114 are provided in FIGS. 25 and 26. In these embodiments, the drive assembly 114 includes a conductive terminal 150a. The conductive terminal 150a is electrically conductive thereby allowing electrical current to readily flow therethrough. The conductive terminal 150a is connected to the power supply 103 of the vehicle. In one embodiment, as shown, the conductive terminal 150a may be coupled to the contacts 117, 119 connected to the power supply 103. The conductive terminal 150a may comprise any suitable conductive material, including, but not limited to copper, brass, any suitable conductive alloy or the like.

The cable 60 includes a first end 121a of the cable 60 coupled to the sliding window 28 and the heating element 54 and a second end 118a is coupled to the drum 122. The first end 118a remains mechanically and electrically coupled to the drive assembly 114 throughout movement of the sliding window 28 and energizing of the heating element 54. The first end 118a may be electrically coupled to the drive assembly 114 using any suitable method, including, but limited to soldering, electrical connectors, and the like. The first end 118a may be mechanically coupled to the drive assembly 114 using any suitable method, such as by fasteners, mechanical connectors, and the like. In one embodiment, the first end 118a of the cable 60 comprises a terminal that engages a pocket in the drum 122. The terminal may be cast, mechanically crimped, or the like. The terminal and the pocket interact mechanically at a mating surface. Load of the cable 60 may be transferred to the drum 122 through contact with the mating surface. In some embodiments, electrical current may pass through the mating surface when entering or leaving the cable 60. Alternatively, a portion of the cable 60 (e.g., a strand or strands 62) may pass through an aperture in the terminal or the drum 122 to electrically connect to components involved with energizing the heating element 54, as described in some of the embodiments below.

As described above, the drum 122 is configured to rotate in a first direction to mechanically wind the cable 60. The drum 122 rotates in a second direction to mechanically unwind the cable 60 for moving the sliding window 28.

A conductive element 160a is coupled to a moving component of the drive assembly 114. Specifically, the conductive element 160a is coupled to at least one of the drum 122 and the cable 60. In other words, the conductive element 160a may be coupled to the drum 122, coupled to the cable 60, or coupled to both the drum 122 and the cable 60. Whether the conductive element 160a is coupled to the drum 122, the cable 60, or both, the conductive element 160a is eventually electrically connected to the cable 60.

The conductive element 160a is movable during movement of the sliding window 28. The conductive element 160a moves as the drum 122 or the cable 60 move to implement movement of the sliding window 28.

The conductive element 160a is electrically conductive thereby allowing electrical current to readily flow therethrough. The conductive element 160a may comprise any suitable conductive material, including, but not limited to copper, brass, conductive metal alloy or the like.

The conductive element 160a interfaces with the conductive terminal 150a for establishing moving, electrical contact. The conductive element 160 contacts the conductive terminal 150a. Typically, the conductive element 160 slidably contacts the conductive terminal 150a. In one embodiment, slidable contact is understood to mean that the conductive element 160 moves along a surface of the conductive terminal 150a while maintaining contact with the conductive terminal 150a. As is described in detail below, such movement may be linear (straight path), rotational (circular path) or any other suitable type of movement.

The conductive element 160a contacts the conductive terminal 150a to provide electrical current to the cable 60 for energizing the heating element 54 for heating the sliding window 28. Contact between the conductive element 160a and the conductive terminal 150a allows electrical current to flow therebetween. The conductive element 160a contacts the conductive terminal 150a during movement of the sliding window 28. Additionally, the conductive element 160a may contact the conductive terminal 150a while the sliding window 28 is stationary. That is, the conductive element 160a may contact the conductive terminal 150a to allow electrical current to flow through the heating element 54 while the sliding window 28 is stationary. Thus, the conductive element 160a may remain in contact with the conductive terminal 150a whether the sliding window 28 is moving or not. Although, those skilled in the art may appreciate that there may be situations where the conductive element 160a may be disconnected from the conductive terminal 150a during inoperation of the heating element 54.

In FIGS. 25 and 26, the conductive terminal 150a is stationary. That is, the conductive terminal 150a is fixed into position. Of course, the conductive terminal 150a may encounter incidental movement (flexing, bending, stress, or the like) as a result of contact with the conductive element 160a. However, the conductive terminal 150a generally remains stationary to provide a consistent point of contact for the moving conductive element 160a.

The drive assembly 114 may comprise a housing 180. Any one, or a combination, of the various components described herein, e.g., drum 122, cables 60, 78, conductive terminals 150a, 150b, conductive elements 160a, 160b may be disposed partially or wholly within the housing 180. The housing may have any suitable configuration for housing the components.

Referring now to the embodiment of FIG. 25, the conductive element 160a is coupled to the cable 60. Electrical contact is established between the cable 60 and the conductive element 160a. The conductive element 160a is electrically conductive such that electrical current may flow between the cable 60 and the conductive element 160a.

In FIG. 25, the conductive element 160a is electrically connected between the first and second ends 121a, 118a of the cable 60. The conductive element 160a in FIG. 25 is in slidable contact with the conductive terminal 150a. In this embodiment, the conductive element 160a brushes against the conductive terminal 150a as the conductive element 160a moves along the linear path 166.

When the conductive element 160a is coupled to the cable 60, the conductive element 160a may define a hollow 162 for receiving the cable 60. This way, the conductive element 160a surrounds a portion of the cable 60. The conductive element 160a may be secured to the cable 60 using any suitable methods.

In FIG. 25, the conductive element 160a has a rectangular prism configuration. The conductive element 160a may be hollow or solid. Portions of the conductive element 160a may be electrically conductive while other portions are electrically insulated to prevent shorting. The conductive element 160a may have any other suitable configuration allowing moving electrical contact.

In this embodiment, the conductive element 160a is configured to move linearly during movement of the sliding window 28, and more specifically, rotation of the drum 122. The conductive element 160a is configured to move along a linear path 166. The conductive terminal 150a is disposed along at least a portion of the linear path 166. In FIG. 25, the conductive terminal 150a is disposed adjacent an entrance or exit of the drum 122.

The conductive element 160a moves in a first linear direction as the drum 122 mechanically winds the cable 60. The conductive element 160a moves in a second linear direction opposite to the first linear direction as the drum 122 mechanically unwinds the cable 60. In other embodiments, the conductive element 160a may move along a path that is not linear. Instead, the path may be curved, curvilinear, and the like.

In one example, a lower face of the conductive element 160a electrically interfaces with the conductive terminal 150a. In another embodiment, the conductive element 160a comprises a slot 196 for receiving the conductive terminal 150a. That is, the conductive terminal 150a slides within the slot 196 such that the conductive element 160a is guided into contact with the conductive terminal 150a. Interface between the conductive terminal 150a and conductive element 160a may be accomplished according to various other methods not specifically recited herein.

In FIG. 25, the second cable 78 is coupled to the drum 122. The second cable 78 includes a second end 118b coupled to the drum 122. A second conductive terminal 150b is electrically connected to the power supply 103 of the vehicle. The second conductive terminal 150b is disposed adjacent the first conductive terminal 150a. The conductive terminals 150a, 150b are connected to opposite polarities of the power supply 103. Specifically, as shown, the first conductive terminal 150a is connected to power supply 103 ground (−) and the second conductive terminal 150b is connected to power supply 103 positive (+). Of course, opposite connection between the conductive terminals 150a, 150b and the polarities of the power supply is possible.

The second conductive terminal 150b may have any suitable configuration described herein or not described recited herein. The second conductive terminal 150b may have a configuration that is the same or different than the first conductive terminal 150a. In FIG. 25, both the first and second conductive terminals 150a, 150b have the same configuration. For simplicity, structure and function of the second conductive terminal 150b that is similar to the first conductive terminal 150a is not repeated.

A second conductive element 160b is also provided. The second conductive element 160b is electrically connected to the second cable 78 and is movable during movement of the sliding window 28. The second conductive element 160b contacts the second conductive terminal 150b to provide electrical current to the second cable 78 to energize the heating element 54.

The second conductive element 160b may have a configuration that is the same or different than the first conductive element 160a. In FIG. 25, both the first and second conductive elements 160a, 160b have the same configuration. For simplicity, structure and function of the second conductive element 160b that is similar to the first conductive element 160a is not repeated. The second conductive element 156b may also have any suitable configuration described herein or not described recited herein.

In FIG. 25, the second conductive element 160b is configured to move along a second linear path 168 that is generally parallel to the first linear path 168. As such, in one embodiment, the second conductive element 160b is disposed adjacent to the first conductive element 160a. The second conductive element 160b moves in the first linear direction as the drum 122 mechanically unwinds the second cable 60 and moves in the second linear direction as the drum 122 mechanically winds the second cable 60. As such, in FIG. 25, the first and second conductive elements 160a, 160b move in opposite directions for any given rotation of the drum 122. Those skilled in the art realize that the first and second conductive elements 160a, 160b, in different configurations, may alternatively move in a common direction for any given rotation of the drum 122.

For the embodiment of FIG. 25, the drum 122 may comprise the first portion 138 and the second portion 140 being electrically isolated by the electrical isolator 141. Although, in instances where the conductive element 160a is coupled directly to the cable 60, such as is shown in FIG. 25, such electrical isolation may not be desired because electrical current does not flow through the drum 122, but rather flows through the conductive elements 160a, 160b directly to the power supply 103 thereby circumventing the drum 122.

Operation of the drive assembly 113 is now described for the embodiment in FIG. 25. Suppose, for illustrative purposes, that movement of the sliding window 28 and energizing of the heating element 54 occur simultaneously. Rotation of the drum 122 causes the first and second conductive elements 160a, 160b to shift linearly as the cables 60 and 78 move to shift the window assembly 28. The conductive elements 160a, 160b slide along the first and second conductive terminals 150a, 150b, respectively.

Concurrently with rotation of the drum 122, electrical current flows from power supply 103 positive (+), to contact 119 of the drive assembly 114, to the second conductive terminal 150b. From the second conductive terminal 150b, electrical current flows directly into the second cable 78 until the first end 121b of the second cable 78 attached to the heating element 54. In returning to power supply 103 ground (−), electrical current flows through the heating element 54 and into the first end 121a of the first cable 60 (opposite side of heating element 54). Thereafter, electrical current flows through the first cable 60 and into the first conductive element 160a attached to the first cable 60. The current is transferred from the first conductive element 160a to the first conductive terminal 150a. From here, current flows through contact 117 of the drive assembly 114 and back to power supply 103 ground (−). In this way, the drive assembly 114 advantageously provides electrical energy to the heating element 54 directly through the cable(s) 60, 78 simultaneously while the window assembly 28 is moving. Of course, the path of electrical current may differ from what is shown depending upon at least, polarity of the respective connections, positioning of the conductive elements 160a, 160b, positioning of the conductive terminals 150a, 150b, and the like.

The embodiment in FIG. 25 reduces the need to electrically connect the cable 60 at the second end 118a because the current travels in and out of the conductive terminals 150a spaced apart from the drum 122. This reduces the need for configurations which have to account for making electrical contact with rotating parts because the conductive element 160a may move along linear paths as a result of being connected to the cable 60.

Referring to the embodiment of FIG. 26, the conductive element 160a is coupled to the drum 122 instead of the cable 60. The second end 118a of the cable 60 is coupled to the drum 122. The conductive element 160a is electrically connected to the second 118a of the cable 60, rather than between the first and second ends 121a, 118a. The conductive element 160a may directly or indirectly electrically connect to the second end 118a of the cable 60. With indirect connection, an intervening electrical element may electrically connect the conductive element 160a and the second end 118a of the cable 60. The conductive element 160a may be electrically connected to the second end 118a of the cable 60 using any suitable method.

In FIG. 26, the conductive element 160a is disposed on a surface 190 of the drum 122 that is free of mechanical interaction with the cable 60. Specifically, the conductive element 160a is disposed on an outer plate of the drum 122. However, in alternative embodiments, the conductive element 160a may be disposed on a surface of the drum 122 that interacts with or guides the cable 60.

In this embodiment, the conductive element 160a is configured to move rotationally during movement of the sliding window 28, and more specifically, rotation of the drum 122. Specifically, the conductive element 160a is configured to rotate about a central axis about which the drum 122 rotates. The conductive element 160a is configured to move along a rotational path. The conductive element 160a is fixed into the rotational path. The conductive element 160a moves in a first rotational direction as the drum 122 mechanically winds the cable 60. The conductive element 160a moves in a second rotational direction opposite to the first rotational direction as the drum 122 mechanically unwinds the cable 60.

The conductive element 160a is in slidable contact with the conductive terminal 150a, or vice-versa. In FIG. 26, the conductive element 160a slidably contacts the conductive terminal 150a using rotational movement. The conductive terminal 150a is stationary and the conductive element 160 brushes along the conductive terminal 150a during rotation of the drum 122 to establish contact. Those skilled in the art appreciate that other methods of slidable contact may be implemented.

In FIG. 26, the conductive element 160a has a circular configuration. The conductive element 160a is an outline of a circle (i.e., ring), as shown in FIG. 26. The conductive element 160a may have any suitable width and any other suitable configuration allowing moving electrical contact. The conductive element 160a may be coupled to the drum 122 using any suitable method.

The conductive terminal 150a in FIG. 26 has a wiper configuration wherein the conductive terminal 150a is flexible and biased into contact with the conductive element 160a. In this way, the conductive terminal 150a interacts with the conductive element 160a in a manner comparable to a vinyl record player. The conductive terminal 150a may be biased by having a resilient construction or by further comprising a resilient member, such as a spring, for ensuring that the electrical contact is made between the conductive terminal 150a and the conductive element 160a.

In one example, an upper face of the conductive element 160a electrically interfaces with the conductive terminal 150a. In another embodiment, the conductive element 160a may comprise a groove or slot defined into the upper face of the conductive element 160a for receiving the conductive terminal 150a. That is, the conductive terminal 150a slides within the groove or slot such that the conductive element 160a is guided into contact with the conductive terminal 150a. Interface between the conductive terminal 150a and conductive element 160a may be accomplished according to various other methods.

In FIG. 26, the second cable 78 is coupled to the drum 122. The second cable 78 includes a second end 118b coupled to the drum 122. The second conductive terminal 150b is electrically connected to the power supply 103 of the vehicle. The second conductive terminal 150b is disposed adjacent the first conductive terminal 150a. The conductive terminals 150a, 150b are connected to opposite polarities of the power supply 103. Specifically, as shown, the first conductive terminal 150a is connected to power supply 103 positive (+) and the second conductive terminal 150b is connected to power supply 103 ground (−). Of course, opposite connection between the conductive terminals 150a, 150b and the polarities of the power supply is possible.

The second conductive terminal 150b may have a configuration that is the same or different than the first conductive terminal 150a. For simplicity, additional structure and function of the second conductive terminal 150b is not repeated. In FIG. 26, both the first and second conductive terminals 150a, 150b generally have the same configuration. However, as described in detail below, the second conductive terminal 150b may be shorter or longer than the first conductive terminal 150a to accommodate differences in the conductive elements 150a, 150b. The second conductive terminal 150b may have any suitable configuration described herein or not described recited herein.

In FIG. 26, the second conductive element 160b is also provided. The second conductive element 160b is electrically connected to the second cable 78, and more specifically, the second end 118b of the second cable 78, and is movable during rotation of the drum 122. The second conductive element 160b and the second conductive terminal 150b contact one another to provide electrical current to the second cable 78 to energize the heating element 54.

In FIG. 26, the second conductive element 160b may have a configuration that is the same or different than the first conductive element 160a. For simplicity, structure and function of the second conductive element 160b that is similar to the first conductive element 160a is not repeated. The second conductive element 156b may also have any suitable configuration described herein or not described recited herein.

The second conductive element 160b is disposed adjacent to the first conductive element 160a in FIG. 26. Alternatively, the second conductive element 160b may be disposed elsewhere on the drum 122, such as on a surface 192 opposite to surface 190 shown in FIG. 26. Those skilled in the art appreciate that the first and second conductive elements 160a, 160b may be disposed on any suitable part of the drum 122 in this embodiment.

In FIG. 26, the second conductive element 160b is configured to move along a second rotational path that is concentric to the first rotational path of the first conductive element 160a. In this embodiment, the first and second conductive elements 160b move in the same direction during rotation of the drum 122. In other words, the first and second conductive elements 160a, 160b are both configured to rotate in the first direction as the drum 122 mechanically winds the first cable 60 (or unwinds the second cable 78) and are both configured to rotate in the second direction as the drum 122 mechanically unwinds the first cable 60 (or winds the second cable 78). This is different than the embodiment of FIG. 25 wherein the first and second conductive elements 160*a*, 160*b* move in opposite directions during rotation of the drum 122. Those skilled in the art that the first and second conductive elements 160*a*, 160*b*, depending upon their respective positioning, may alternatively move in opposing directions for any given rotation of the drum 122.

In FIG. 26, both the first and second conductive elements 160*a*, 160*b* each have the circular configuration and are disposed on the same surface 190 of the drum 122. The first and second conductive elements 160*a*, 160*b* are disposed concentrically about the rotational axis of the drum 122. Specifically, in FIG. 26, the second conductive element 160*b* is disposed within the first conductive element 160*a* such that the first conductive element 160*a* surrounds the second conductive element 160*b*. In this example, the second conductive element 160*b* comprises a radius that is less than a radius of the first conductive element 160*a*. To reach the second conductive element 160*b*, the second conductive terminal 150*b* is longer than the first conductive terminal 150*a*. In other embodiments, the first and second conductive elements 160*a*, 160*b* may have the same radius. Alternatively, the radius of the second conductive element 160*b* may be greater than the radius of the first conductive element 160*a*.

Because electrical current flows through the drum 122 in FIG. 26, the drum 122 may comprise the first portion 138 and the second portion 140 being electrically isolated by the electrical isolator 141 to prevent electrical shorting between the cables 60, 78.

Operation of the drive assembly 114 of FIG. 26 is now described. Suppose, for illustrative purposes, that movement of the sliding window 28 and energizing of the heating element 54 occurs simultaneously. Rotation of the drum 122 causes the first and second conductive elements 160*a*, 160*b* to shift rotationally as the cables 60 and 78 move to shift the window assembly 28. The first and second elements 160*a*, 160*b* rotationally slide against the first and second conductive terminals 150*a*, 150*b*, respectively.

Concurrently with movement of the drum 122, electrical current flows from power supply 103 positive (+), to contact 117 of the drive assembly 114, to the first conductive terminal 150*a*. From the first conductive terminal 150*a*, electrical current flows directly into the first conductive element 160 by virtue of the moving electrical contact. Since the first conductive element 160 is connected to the second end 118*a* of the first cable 60, the current flows into the first cable 60. The current reaches the first end 121*a* of the first cable 60 attached to the heating element 54. In returning to power supply 103 ground (−), electrical current flows through the heating element 54 and into the first end 121*b* of the second cable 78 (at the opposite side of heating element 54). Thereafter, electrical current flows through the second cable 78 to the second end 118*b* of the second cable 78 attached to the drum 122. From here, the current passes into the second conductive element 160*b*. Once again, the current is transferred from the second conductive element 160*b* to the second conductive terminal 150*b* by virtue of the moving electrical contact. From here, current flows through contact 119 of the drive assembly 114 and back to power supply 103 ground (−). In this way, the drive assembly 114 advantageously provides electrical energy to the heating element 54 directly through the cables 60, 78 simultaneously while the window assembly 28 is moving. Of course, the path of electrical current may differ from what is shown depending upon at least, polarity of the respective connections, locations of the conductive elements 160*a*, 160*b* and the conductive terminals 150*a*, 150*b* and the like.

The embodiment in FIG. 26 reduces the need to transfer electrical current at a specific moving location between the first and second ends 121*a*, 118*a* of the cable 60 because the current instead travels in or out of the conductive terminal 150*a* that is connected to the second end 118*a* at the drum 122. The embodiment of FIG. 26 also reduces the amount of movement incurred by the conductive element 160*a* potentially increasing reliability of the electrical connection. Furthermore, this embodiment reduces the need to electrically contact linearly displaceable parts (such as a specific location between the first and second ends 121*a*, 118*a* of the cable 60) because the conductive element 160*a* moves along a rotational path.

Those skilled in the art appreciate that the configurations of the drive assembly 114, including interaction between the conductive terminal 150*a* and conductive element 160*a* for any of the embodiments described herein may be implemented for any given sliding window assembly configuration derivable from the scope of the invention. For instance, the various embodiments described herein may be accomplished using solely the one cable 60 or both cables 60, 78. In addition, those skilled in the art will appreciate that the configurations of the drive assembly 114, including interaction between the conductive terminal 150*a* and conductive element 160*a* for any of the embodiments described herein may be implemented for assemblies other than a sliding window assembly wherein a sliding or movable object also includes an electrical element such that the cable 60 and drive assembly 114 may be used in a similar manner to that described above in order to both mechanically drive the sliding or movable object and to energize the electrical element. For example, the drive assembly 114 and cable 60 may be used to operate an adjustable seating mechanism wherein the seat is movable along a track or guide path in a similar manner to the sliding window assembly described herein, and wherein the seat also includes an electrical element, such as a heating element for heating a surface of the seat. In such an example, the drive assembly 114 and the cable assembly, including cable 60 and optionally cable 78, may operate to mechanically pull the seat along the guide path, and may also function to energize the heating element of the seat.

Many modifications and variations of the subject invention are possible in light of the above teachings. The foregoing invention has been described in accordance with the relevant legal standards. Thus, the description is exemplary rather than limiting in nature. Variations and modifications to the disclosed embodiment can become apparent to those skilled in the art and do come within the scope of the invention.

What is claimed is:

1. A sliding window assembly for a vehicle, said assembly comprising:
   a guide track adapted to be coupled to the vehicle;
   a sliding window movable relative to said guide track between an open position and a closed position;
   a heating element coupled to said sliding window for heating said sliding window;
   a drive assembly including a drum being configured to rotate and including a conductive terminal being connected to a power supply of the vehicle; and
   a cable having a first end coupled to said sliding window and said heating element and a second end that is coupled to said drum and with said drum being configured to rotate in a first direction to mechanically wind said cable and rotate in a second direction to mechanically unwind said cable for moving said sliding window;

wherein a conductive element is coupled to at least one of said drum and said cable with said conductive element being electrically connected to said cable and being movable during movement of said sliding window; and wherein said conductive element is configured to contact said conductive terminal throughout movement of said sliding window and to provide electrical current to said cable for energizing said heating element for heating said sliding window, wherein said conductive element is disposed on a surface of said drum that is free of mechanical interaction with said cable and wherein said conductive element has a circular configuration.

2. The sliding window assembly of claim 1 wherein said conductive element is configured to rotate in said first direction as said drum mechanically winds said cable and wherein said conductive element is configured to rotate in said second direction as said drum mechanically unwinds said cable.

3. The sliding window assembly of claim 1 wherein said conductive terminal is biased into contact with said conductive element.

4. The sliding window assembly of claim 1 wherein said conductive element is electrically connected to said second end of said cable.

5. The sliding window assembly of claim 1, wherein:
said cable is further defined as a first cable; and
further comprising a second cable having a first end coupled to said sliding window and said heating element and a second end that is coupled to said drum and with said drum being configured to rotate in said first direction to mechanically unwind said second cable and rotate in said second direction to mechanically wind said second cable for moving said sliding window; and
said conductive terminal is further defined as a first conductive terminal; and said drive assembly comprises a second conductive terminal being connected to the power supply of the vehicle; and
said conductive element is further defined as a first conductive element; and
further comprising a second conductive element being coupled to said drum and electrically connected to said second cable and movable during movement of said sliding window and wherein said second conductive element is configured to contact said second conductive terminal throughout movement of said sliding window and to provide electrical current to said second cable to energize said heating element for heating said sliding window.

6. The sliding window assembly of claim 5 wherein said first and second conductive elements are disposed on a surface of said drum that is free of mechanical interaction with said cable.

7. The sliding window assembly of claim 5 wherein said first and second conductive elements are configured to rotate in said first direction as said drum mechanically winds said first cable and to rotate in said second direction as said drum mechanically winds said second cable.

8. The sliding window assembly of claim 5 wherein said first conductive element and said second conductive element each have a circular configuration.

9. The sliding window assembly of claim 8 wherein said first and second conductive elements are disposed concentrically such that one of said first and second conductive elements surrounds said other of said first and second conductive elements.

10. The sliding window assembly of claim 6 wherein said first conductive terminal is biased into contact with said first conductive element and wherein said second conductive terminal is biased into contact with said second conductive element.

11. The sliding window assembly of claim 6 wherein said first conductive element is electrically connected to said second end of said first cable and wherein said second conductive element is electrically connected to said second end of said second cable.

12. The sliding window assembly of claim 1 wherein said conductive element is coupled to said cable.

13. The sliding window assembly of claim 12 wherein said conductive element defines a hollow for receiving said cable and wherein said conductive element surrounds a portion of said cable.

14. The sliding window assembly of claim 12 wherein said conductive element is configured to move along a linear path in a first linear direction as said drum mechanically winds said cable and to move in said second linear direction opposite to said first linear direction as said drum mechanically unwinds said cable.

15. The sliding window assembly of claim 14 wherein said conductive terminal is disposed along at least a portion of said linear path.

16. The sliding window assembly of claim 12 wherein said conductive element is electrically connected between said first and second ends of said cable.

17. The sliding window assembly of claim 12 wherein:
said cable is further defined as a first cable; and
further comprising a second cable having a first end coupled to said sliding window and said heating element and a second end that is coupled to said drum and with said drum being configured to rotate in said first direction to mechanically unwind said second cable and rotate in said second direction to mechanically wind said second cable for moving said sliding window; and
said conductive terminal is further defined as a first conductive terminal; and said drive assembly comprises a second conductive terminal being connected to the power supply of the vehicle; and
said conductive element is further defined as a first conductive element; and
further comprising a second conductive element being coupled to said drum and electrically connected to said second cable and movable during movement of said sliding window and wherein said second conductive element is configured to contact said second conductive terminal throughout movement of said sliding window and to provide electrical current to said second cable to energize said heating element for heating said sliding window.

18. The sliding window assembly of claim 17 wherein said first conductive element defines a hollow for receiving said first cable and wherein said first conductive element surrounds a portion of first second cable and wherein said second conductive element defines a hollow for receiving said second cable and wherein said second conductive element surrounds a portion of said second cable.

19. The sliding window assembly of claim 17 wherein said first conductive element is configured to move along a first linear path in a first linear direction as said drum mechanically winds said first cable and to move in said second linear direction opposite to said first linear direction as said drum mechanically unwinds said first cable and wherein said second conductive element is configured to move along a second linear path in said first linear direction as said drum mechanically winds said second cable and move in said second linear direction as said drum mechanically unwinds said second cable.

20. The sliding window assembly of claim 19 wherein said first conductive terminal is disposed along at least a portion of said first linear path and wherein said second conductive terminal is disposed along at least a portion of said second linear path.

21. The sliding window assembly of claim 18 wherein said first conductive element is electrically connected between said first and second ends of said first cable and wherein said second conductive element is electrically connected between said first and second ends of said second cable.

22. The sliding window assembly of claim 1 wherein said conductive element slidably contacts said conductive terminal.

23. The sliding window assembly of claim 1 wherein said conductive terminal is stationary.

24. The sliding window assembly of claim 1 wherein said drum comprises a first portion and a second portion being electrically isolated from said first portion.

25. A cable drive system for a sliding window having a heating element for heating the sliding window, said system comprising:
   a drive assembly including a drum being configured to rotate and including a conductive terminal being connected to a power supply of the vehicle; and
   a cable being coupled to said drum and with said drum being configured to rotate in a first direction to mechanically wind said cable and rotate in a second direction to mechanically unwind said cable for moving the sliding window between an open position and a closed position;
   wherein a conductive element is coupled to at least one of said drum and said cable with said conductive element being electrically connected to said cable and being movable during rotation of said drum and wherein said conductive element is configured to contact said conductive terminal throughout movement of the sliding window and to provide electrical current to said cable for energizing the heating element for heating the sliding window, wherein said conductive element is disposed on a surface of said drum that is free of mechanical interaction with said cable and wherein said conductive element has a circular configuration.

26. A method of operating a sliding window assembly of a vehicle, the sliding window assembly including a guide track adapted to be coupled to the vehicle, a sliding window movable relative to the guide track between an open position and a closed position, a heating element coupled to the sliding window for heating the sliding window, a drive assembly including a drum being configured to rotate and including a conductive terminal being connected to a power supply of the vehicle, a cable having a first end coupled to the sliding window and the heating element and a second end that is coupled to the drum, and a conductive element coupled to at least one of the drum and the cable with the conductive element being electrically connected to the cable, said method comprising:
   rotating the drum to mechanically wind or unwind the cable for moving the sliding window;
   moving the conductive element during movement of the sliding window;
   contacting the conductive element and the conductive terminal throughout movement of the sliding window;
   providing electrical current to the cable through the conductive element; and
   energizing the heating element for heating the sliding window, wherein said conductive element is disposed on a surface of said drum that is free of mechanical interaction with said cable and wherein said conductive element has a circular configuration.

27. The window assembly of claim 1 wherein said conductive element is configured to contact said conductive terminal throughout any and all movement of said sliding window at and between the open and closed positions.

* * * * *